United States Patent [19]

Steiger et al.

[11] 4,138,551

[45] Feb. 6, 1979

[54] SPECTRAL SENSITIZATION OF PHOTOGRAPHIC MATERIAL AND NEW SPECTRAL SENSITIZERS

[75] Inventors: Rolf Steiger, Praroman; Jean-Francois Reber, Marly, both of Switzerland; Aaron D. Ezekiel, Sevenoaks; Geoffrey E. Ficken, Ilford, both of England

[73] Assignee: Ciba-Geigy AG, Basel, Switzerland

[21] Appl. No.: 781,383

[22] Filed: Mar. 25, 1977

Related U.S. Application Data

[62] Division of Ser. No. 665,981, Mar. 11, 1976, Pat. No. 4,040,825.

[30] Foreign Application Priority Data

| | | | |
|---|---|---|---|
| Mar. 18, 1975 | [GB] | United Kingdom | 11187/75 |
| Apr. 16, 1975 | [CH] | Switzerland | 4847/75 |
| Feb. 20, 1976 | [CH] | Switzerland | 2100/76 |

[51] Int. Cl.$^2$ .......... C09B 23/06; C09B 23/04

[52] U.S. Cl. .......... 542/435; 542/434; 542/437; 542/451; 542/452; 542/471; 542/474; 542/475; 542/476

[58] Field of Search .......... 542/434, 435, 437, 451, 542/452, 471, 474, 475, 476

[56] References Cited

U.S. PATENT DOCUMENTS

| | | | |
|---|---|---|---|
| T. 889,016 | 8/1971 | Van Lare et al. | 542/471 X |
| 2,776,280 | 1/1957 | Brooker et al. | 542/471 X |
| 3,635,956 | 1/1972 | Krapcho | 542/452 X |
| 3,681,080 | 8/1972 | Nakagawa et al. | 542/451 X |
| 3,684,517 | 8/1972 | Brooker et al. | 542/435 X |
| 3,726,684 | 4/1973 | Riester et al. | 542/475 X |

*Primary Examiner*—Thomas Waltz

*Attorney, Agent, or Firm*—Sprung, Felfe, Horn, Lynch & Kramer

[57] ABSTRACT

The present invention relates to light-sensitive photographic material with a light-sensitive heavy metal compound, e.g. a silver halide, and a spectral sensitizer. The spectral sensitizer is a compound in which the radicals of a sensitizing dyestuff are covalently bonded to amino, imino, hydroxyl, mercapto, carboxylic acid or carboxylic acid amide groups of a natural hydrophilic colloid, preferably gelatin.

The invention also relates to new sensitizing dyes which are dinuclear cyanine dyes or merocyanine dyes which have attached either to a heterocyclic nucleus of the dye or to its methine chain a group which is reactive with a hydrophilic colloid.

5 Claims, No Drawings

SPECTRAL SENSITIZATION OF PHOTOGRAPHIC MATERIAL AND NEW SPECTRAL SENSITIZERS

This is a division of application Ser. No. 665,981, filed Mar. 11, 1976, now U.S. Pat. No. 4,040,825.

This invention relates to the spectral sensitisation of photographic material and to novel spectral sensitisers.

It is known that light-sensitive heavy metal compounds as a rule are sensitive only in a limited part range of the visible and invisible spectrum. Thus, for example, the sensitivity range of the silver halides extends only over the spectral range between 250 and 500 nm with a maximum at about 300 nm. It is possible, with the aid of certain dyestuffs which have become known as optical or spectral sensitisers, to expand the sensitivity range on the long-wavelength side up to the green or red or even up to the infrared spectral region. The sensitivity in the spectral region of the characteristic sensitivity can also be increased beyond the natural limit by the addition of so-called blue sensitisers. These properties have been very widely applied in the field of photography; the manufacture of modern highly sensitive photomaterials is inconceivable without spectral sensitisers: orthochromatic and panchromatic exposure materials make it possible to use photography over the entire visible spectral region; the infrared-sensitive materials have opened up new possibilities which exceed the capability of the human eye. Colour photography which is now highly developed only became possible through the provision, by means of spectral sensitisers, of materials which are sensitive only for a limited spectral region.

It has hitherto been assumed as an important prerequisite of the effectiveness of spectral sensitisers, that the latter must be in close contact with the surface of the light-sensitive body. This is suggested by the assumption that spectral sensitisation can only be based on a charge transfer (electron transfer) from the sensitising dyestuff to the light-sensitive body. It has therefore become common practice, as a customary method for the manufacture of photographic materials, to add the sensitising dyestuff in an organic solvent, which as a rule is miscible with water, to aqueous suspensions of the silver halide grains. The dyestuffs are thus adsorbed, in the form of thin, usually at most monomolecular layers, on the surfaces of the silver halide crystals. Although this process is at present still used almost universally, it brings with it a number of disadvantages which in many cases can result in faults and variabilities: the adsorption process itself proceeds relatively slowly due to the large dilution and in most cases ceases only after several minutes. As a typical equilibrium reaction, adsorption is never fully complete and can also proceed in reverse owing to certain adverse influences. For example, the displacement of adsorbed sensitisers by other dissolved substances, for example wetting agents present in the photographic emulsion, is known. Non-adsorbed sensitisers can diffuse and penetrate into adjacent layers, which can cause faulty sensitisations. Finally, it is known that excessive amounts of sensitisers, which, for example, form adsorbed layers which are thicker than monomolecular layers, can give rise to desensitisation. This fact is a particular disadvantage since it restricts the amount of sensitiser which can be used and hence the amount of light which can be absorbed by the latter and thus also the sensitivity which can be achieved. Adverse side effects frequently also arise from the necessity of dissolving the dyestuff in an organic solvent when using the customary sensitising method. The solvents can produce undesired side effects, for example a precipitation of constituents of the emulsion. When the photographic layers are dried the solvents must be removed in turn and are either lost or must be recovered in costly installations. In the drying process, solvent vapours can also lead to an explosion risk.

Because of the said disadvantages, various attempts have already been made also to use other processes for the spectral sensitisation of light-sensitive heavy metal compounds:

Thus, those light-sensitive substances in particular which are present in the form of single crystals of vapour-deposited layers without a binder can also be brought into contact with the sensitiser dyestuff by other means. U.S. Pat. No. 3,359,112 (column 7, lines 1 to 17) has, for example, disclosed that sensitisers can also be deposited on the surface of the light-sensitive compound by a sublimation process. The U.S. Pat. No. 3,684,548 and Japanese Patent Publicator No. 48/26,710 have proposed a coating process for arranging light-sensitive substances and spectral sensitisers in separate layers one above the other.

Finally, processes have been disclosed in German Offenlegungsschriften Nos. 2,322,929 and 2,355,688 according to which it is possible to make sensitisers, which are anchored to a special carrier, effective by mere mechanical contact with the surface of the light-sensitive substance, it even being possible to reverse and repeat this contacting and thus to turn the specific spectral sensitivity on and off as desired.

The said processes cannot, however, be used for sensitising those heavy metal compounds which are present in the form of dispersions of individual grains, such as is the case, for example, with most photographic materials based on silver halide. Also, these processes do not in any way eliminate the disadvantage that only an extremely thin, as a rule monomolecular layer of the dyestuff here participates in the sensitisation.

U.S. Pat. No. 3,469,987 proposes to disperse water-insoluble spectral sensitisers in hydrophilic colloids, such as, for example, gelatine, and to add this dispersion to a customary light-sensitive silver halide dispersion in a hydrophilic colloid. Admittedly this procedure makes it possible to use less than the customary amounts of solvent for the preparation of the dyestuff dispersions; these measures do not, however, avoid the general disadvantages of the adsorptive sensitisation process.

The two U.S. Pat. Nos. 3,622,316 and 3,622,317 propose to coat, by adsorption, light-sensitive silver halide grains in a dispersed state by means of two or more monomolecular layers of different cyanine dyestuffs, it being intended that the dyestuff layers absorb at increasingly shorter wavelengths from the inside out. The wavelength ranges of the main absorption regions of successive dyestuffs should then overlap. According to this invention, increased sensitivities are said to be obtained; the abovementioned disadvantages of adsorptive sensitisation, however, remain present even in such a system.

In the meantime, Kuhn and Möbius (Angew. Chemie, International Edition, volume 10, No. 9 (1971) page 620 et seq.) have proved that a direct contact between the sensitiser and the surface of the light-sensitive substance is not absolutely necessary. The authors named have inter alia shown that sensitisation effects can be obtained over distances of up to 300 Å by the insertion of monomolecular intermediate layers of nonsensitising substances.

Multi-layer sensitisation systems have also been described and discussed by G. R. Bird, Photographic Science and Engineering 13 (5), September/October 1974, page 562–568.

The present invention relates to a new photographic material which can be manufactured by a new process, according to which light-sensitive heavy metal compounds are effectively sensitised by a method which is different from the customary adsorption process. The sensitisation process can be used both for those light-sensitive heavy metal compounds which are present in the form of single crystals or of layers which are free from binder, and for those which are applied in the form of a dispersion of micro-crystals containing a binder. Various disadvantages of the customary adsorption process can thus be avoided. By the new process it is possible to obtain effects which cannot be achieved by the adsorption process, such as, for example, an increase in the maximum sensitivity which normally is limited by the formation of a monomolecular layer. The process can also be combined with the adsorption process and thus permits certain planned combination effects.

The light-sensitive photographic material according to the invention which is preferably obtainable by this process contains a light-sensitive heavy metal compound and a spectral sensitiser. The material is characterised in that it contains, as the spectral sensitiser, a compound in which the radicals of a sensitising dyestuff are covalently bonded to amino, imino, hydroxyl, mercapto, carboxylic acid or carboxylic acid amide groups of a natural hydrophilic colloid.

The groups of the colloid, which participate in bonding, thus contain, as a substituent, a radical of a sensitising dyestuff, which in its turn is bonded to one of the said groups of the colloid by an appropriate bridge member. In the following text, the term "sensitiser" relates to the colloid thus modified, whilst a "sensitiser dyestuff" is to be understood as a compound which is not bonded to the colloid and is used for the spectral sensitisation. As can be seen from the above statements, the material can also consist of the light-sensitive heavy metal compound and the sensitiser which are in mutual contact permanently or temporarily, even merely mechanically and hence reversibly (see German Offenlegungsschrift No. 2,322,929).

In any case, however, spectrally sensitised heavy metal compounds are required for the present invention, and these are advantageously obtained when the light-sensitive heavy metal compound is brought into contact with the reaction product, which preferably is in aqueous solution, of a hydrophilic colloid of the type indicated with a sensitising dyestuff containing groups which are reactive towards the colloid.

Suitably the sensitisers can be obtained from the colloid and sensitising dyestuffs containing reactive groups. Suitable sensitising dyestuffs which can be provided with a reactive group are those which have, for example, been described in U.S. Pat. Nos. 1,846,301, 1,846,302, 1,942,854, 1,990,507, 2,112,140, 2,165,338, 2,493,747, 2,493,748, 2,503,776, 2,519,001, 2,666,761, 2,734,900, 2,739,149, 2,739,964 and 3,469,987 and G.B. Pat. No. 450,958, and also further dyestuffs, especially cyanine dyestuffs, such as cryptocyanines, merocyanines, azacyanines, neocyanines, phthalocyanines, and also chlorophyll, pinacyanolblue, malachite green, erythrosin, safranines, methylene blue and others. A list of dyestuffs acting as sensitisers is given by F. M. Hamer: "The Cyanine Dyes and Related Compounds" (Interscience Publishers London + New York 1964) and by H. Meier: "Spectral Sensitisation" (The Focal Press, London + New York 1968), page 33 to 77.

Possible reactive groups which can be introduced into the dyestuff molecule are above all mono- or dihalogenotriazine groups, such as say mono- or dichlorotriazine groups or mono- or di-bromotriazine groups, it being possible, in the case of monohalogenotriazinyl, for yet further substituents, such as, for example, OH groups, to be present.

Azines and various leaving groups are in general suitable for this purpose. A detailed list is given by Venkataraman: "The Chemistry of Synthetic Dyes", volume VI. Examples of further suitable reactive groups are mono-, di- or cri-chloropyrimidinyl, chlorobenzotriazolyl, 2,3-dichloroquinoxalin-6-one or the corresponding bromo compounds, vinylsulphonyl, β-chloroethylsulphonyl and also isocyanate and isothiocyanate groups. Further reactive groups are described in DT-OS No. 2,410,973.

In some cases, the reactive groupings required for the reaction of the sensitising dyestuffs with the hydrophilic colloids can be introduced into the dyestuff molecule by methods which are in themselves known. Otherwise, more additional details on this topic are given further below.

The dyestuffs of the following formulae should first be mentioned as examples of reactive sensitising dyestuffs which can be reacted with a hydrophilic colloid and used, according to the present invention, in this form for optically sensitising light-sensitive heavy metal compounds:

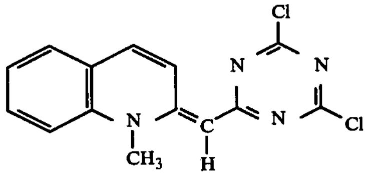

(1.1)

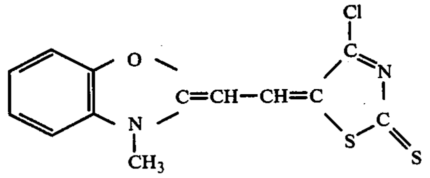

(1.2)

-continued
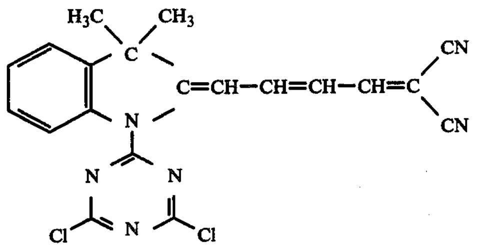
(1.3)
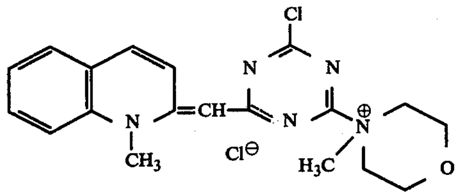
(1.4)
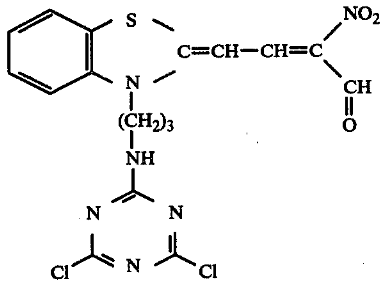
(1.5)
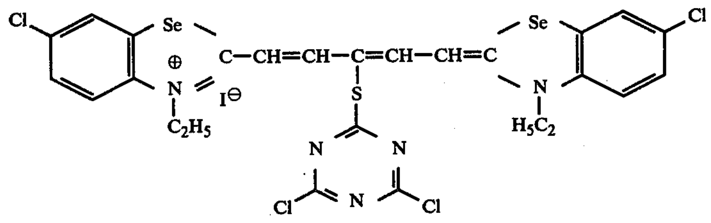
(1.6)
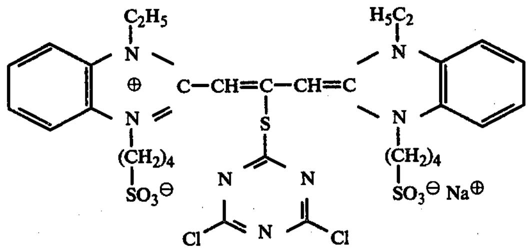
(1.7)
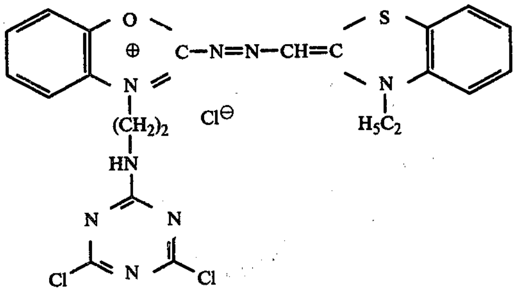
(1.8)

-continued

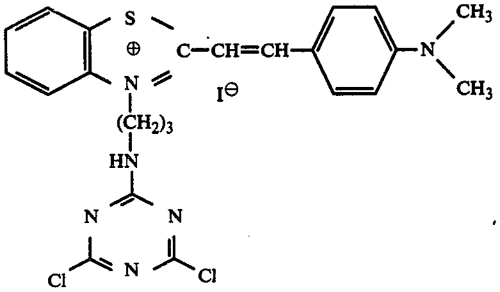

(1.9)

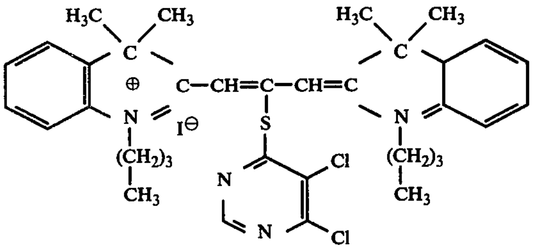

(1.10)

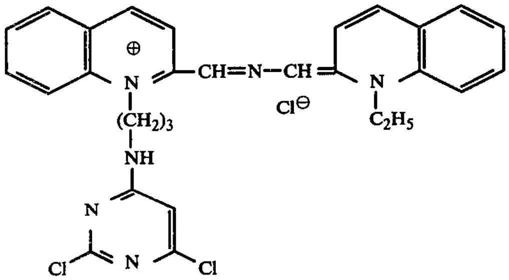

(1.11)

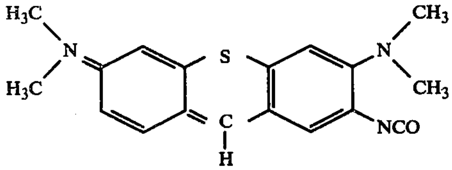

(1.12)

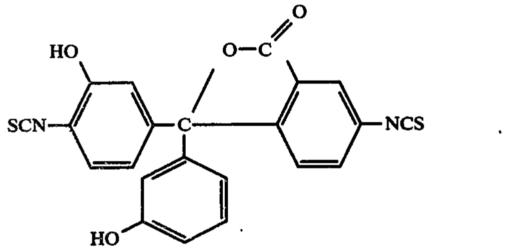

(1.13)

Binuclear cyanine and merocyanine dyestuffs which contain a group which is bonded to one of the heterocyclic rings or to the methine chain and is reactive with the groups mentioned, are generally of particular interest.

Amongst these, particularly advantageous reactive groups are vinyl groups or chloro- or bromo-vinyl groups, such as occur in the following atom groupings: $—NH—OC—CH{=}CH_2$, $—CH_2—O—CO—NH—OC—CH{=}CH_2$, $—CH_2—NH—CO—NH—OC—CH{=}CH_2$, $—NH—OC—CH_2—CH_2—SO_2—CH{=}CH_2$, $—NH—CH_2—CH_2—SO_2—CH{=}CH_2$, $—NH—OC—CCl{=}CH_2$ and $—NH—OC—CBr{=}CH_2$.

Further advantageous reactive groups are azines, diazines and triazines which contain at least one so-called leaving group. Here, possible leaving substituents or leaving groups are in particular chlorine, bromine and ammonium and also N-methylmorpholinium.

Radicals which should be mentioned here are those of the formulae

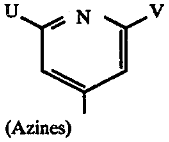

, (Azines)

(2.1)

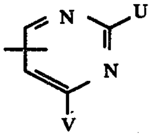

(2.2)

-continued
(Diazines)

and

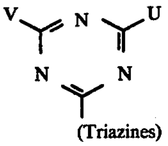
(2.3)

(Triazines)

wherein at least one of the sumbols U and V denotes a leaving group and the other also denotes a leaving group or a hydroxyl group or an alkoxy group with at most 4 carbom atoms. Similar reactive groups are those of the formula

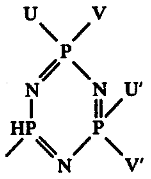
(2.4)

wherein at least one of the sumbols U, V, U' and V' denotes a leaving group and the others also denote leaving groups or hydroxyl groups or alkoxy groups with at most 4 carbon atoms.

Further reactive groups are benzthiazole and quinoxaline radicals with at least one leaving group, preferably at least one reactive chlorine atom, such as is the case in the compounds of the formulae

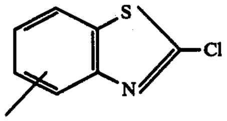
(2.5)

(chlorobenzthiazolyl)
and

-continued

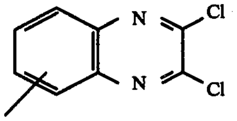
(2.6)

(2,3-dichlorquinoxalyl)

Examples of other reactive groups are aldehyde groups, epoxy groups, aziridine groups, isocyanate and isothiocyanate groups and functionally modified carboxylic acid groups, such as carboxylic acid halide and carboxylic acid anhydride groups.

As indicated above, the reactive groups are present, for example, in binuclear cyanine dyestuffs. In accordance with Hamer "The Cyanine Dyes and Related Compounds" [Interscience 1964], a binuclear cyanine dyestuff is the salt of a monobasic acid (mono-acid) in which the nitrogen atoms of two heterocyclic nuclei are linked to one another by a chain of conjugated double bonds, this chain consisting of an odd number of members.

The nitrogen atom of one heterocyclic ring is tertiary and that of the other is qúaternary. The term also comprises mono- and di-azacyanines in which the chain possesses one or two nitrogen atoms, in place of carbon atoms, as members.

According to Hamer, loc. cit., merocyanine dyestuffs are defined as non-ionic compounds of the formula

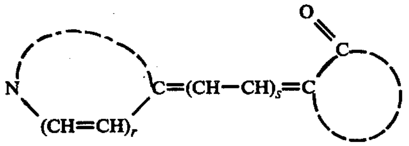
(2.7)

wherein r is 0 or 1 and s is 0, 1, 2 or 3. The link between the two rings thus is a direct bond or consists of an even number of chain members.

The dyestuffs, containing reactive groups, of the following formulae (3.1) to (3.16) can also advantageously be used as starting materials for the manufacture of the spectral sensitisers present in accordance with the invention in the light-sensitive materials.

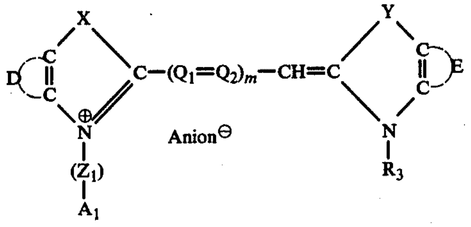
(3.1)

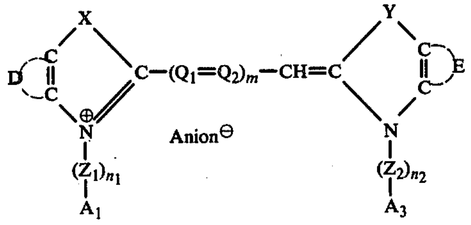
(3.2)

-continued
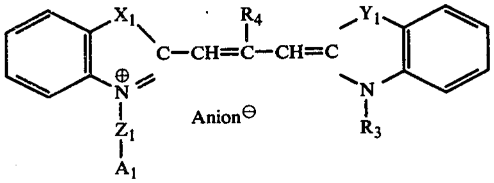
(3.3)
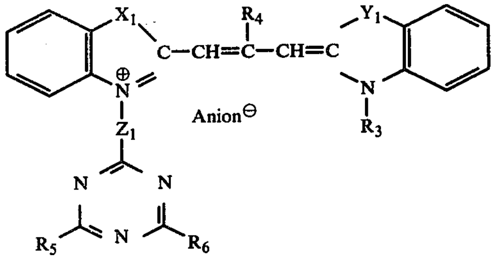
(3.4)
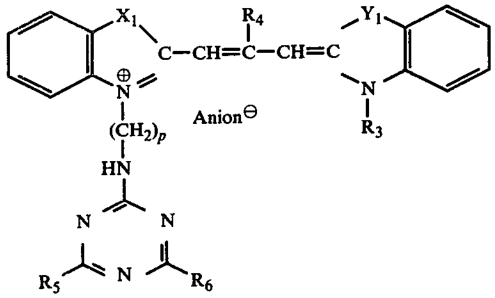
(3.5)
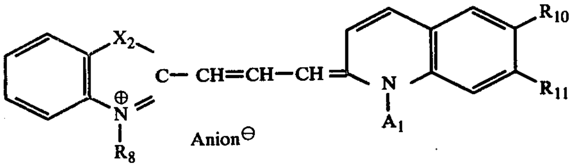
(3.6)
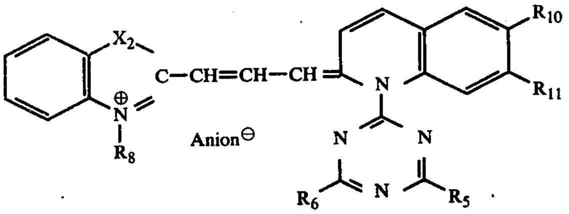
(3.7)
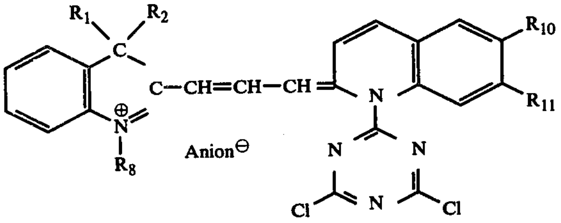
(3.8)
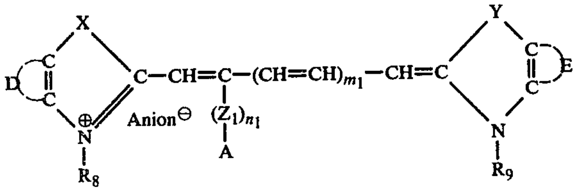
(3.9)
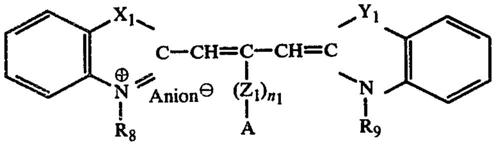
(3.10)

-continued
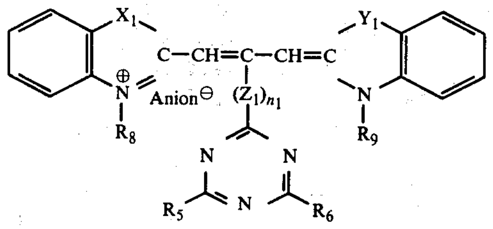
(3.11)
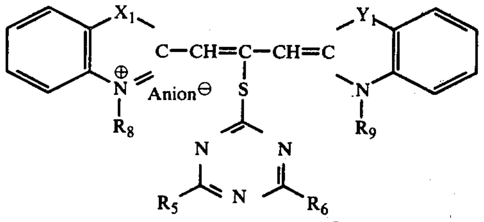
(3.12)
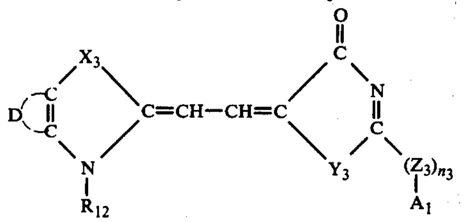
(3.13)
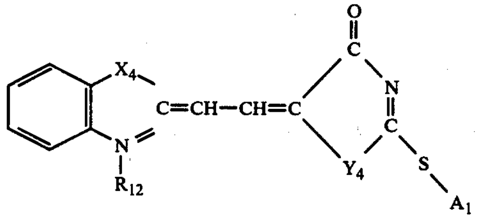
(3.14)
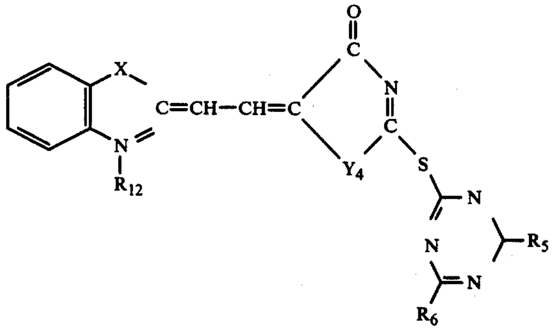
(3.15)
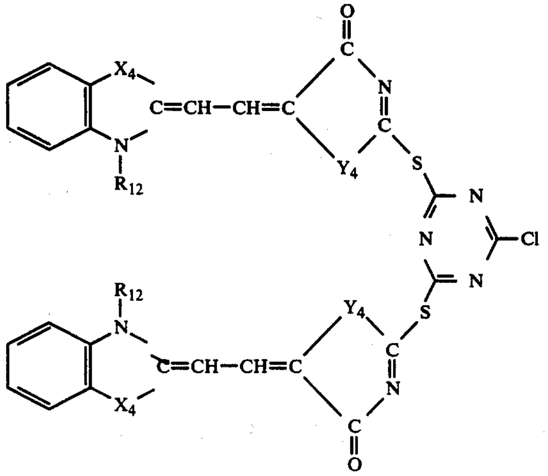
(3.16)
In the above formulae (3.1) to (3.16), and also in the formulae (3.51) to (3.515) below, the individual symbols always have the same meaning, and denote the following:

$A_1$ denotes a group which is reactive towards the hydrophilic colloid, for example a group of the formula (2.3);

$A_2$ denotes a group which is reactive towards the hydrophilic colloid;

D denotes the complement to give a benzene or naphthalene radical which is optionally further substituted;

E denotes the complement to give a benzene or naphthalene radical which is optionally further substituted;

Q denotes a chloride, bromide or iodide ion;

—($Q_1$=$Q_2$)— denotes a system of conjugated double bonds, preferably —CH=$CR_4$—, wherein $R_4$ represents a hydrogen atom, a methyl group or an ethyl group, or also —N=CH— or —N=N—;

$R_1$ denotes a hydrogen atom or a lower alkyl group;

$R_2$ denotes a hydrogen atom or a lower alkyl group;

$R_3$ denotes a lower alkyl, alkoxyalkyl, alkylcarboxylic acid or alkylsulphonic acid group;

$R_4$ denotes a hydrogen atom, a methyl group or an ethyl group;

$R_5$ and $R_6$ either both denote a leaving group or one denotes a leaving group and the other denotes a lower alkoxy group or a hydroxyl group;

$R_7$ denotes a lower alkyl group;

$R_8$ denotes a lower alkyl, alkoxyalkyl, alkylcarboxylic acid or alkylsulphonic acid group;

$R_9$ denotes a lower alkyl, alkoxyalkyl, alkylcarboxylic acid or alkylsulphonic acid group;

$R_{10}$ denotes a hydrogen atom or a lower alkyl or alkoxy group;

$R_{11}$ denotes a hydrogen atom or a lower alkyl or alkoxy group;

$R_{12}$ denotes a lower alkyl, alkoxyalkyl, alkylcarboxylic acid or alkylsulphonic acid group;

X denotes one of the ring constituents —C($R_1R_2$)—, —CH=CH—, —O—, —S—, —Se— and —$NR_7$—, $R_1$ and $R_2$ independently of one another denoting a hydrogen atom or a lower alkyl group and $R_7$ denoting a lower alkyl group;

$X_1$ denotes one of the ring constituents —O—, —S—, —Se— and —$NR_7$—, $R_7$ denoting a lower alkyl group;

$X_2$ denotes one of the ring constituents —O—, —S—, —Se—, —NH— and —C($R_1R_2$)—, $R_1$ and $R_2$ independently of one another denoting a hydrogen atom or a lower alkyl group;

$X_3$ denotes one of the ring constituents —CH=CH—, —O—, —S—, —Se—, —C($R_1R_2$)— and —$NR_7$—, $R_1$ and $R_2$ independently of one another denoting a hydrogen atom or a lower alkyl group and $R_7$ denoting a lower alkyl group;

$X_4$ denotes one of the ring constituents —S—, —Se—, —O— and —$NR_7$—, $R_7$ denoting a lower alkyl group;

Y denotes one of the ring constituents —C($R_1R_2$)—, —CH=CH—, —O—, —S—, —Se— and —$NR_7$—, $R_1$ and $R_2$ independently of one another denoting a hydrogen atom or a lower alkyl group and $R_7$ denoting a lower alkyl group;

$Y_1$ denotes one of the ring constituents —O—, —S—, —Se— and —$NR_7$—, $R_7$ denoting a lower alkyl group;

$Y_4$ denotes one of the ring constituents —O—and —S—;

$Z_1$ denotes a linking member;

$Z_2$ denotes a linking member;

$Z_3$ denotes a linking member;

m denotes one of the values 0, 1 and 2;

$m_1$ denotes one of the values 0 and 1;

$n_1$ denotes one of the values 0 and 1;

$n_2$ denotes one of the values 0 and 1;

$n_3$ denotes one of the values 0 and 1 and p denotes one of the values 2, 3, 4 and 5.

The dyestuffs of the formula (3.5) can be manufactured by reacting a trimethinecyanine dyestuff of the formula (3.51)

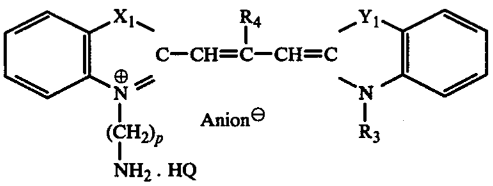

with a triazine of the formula

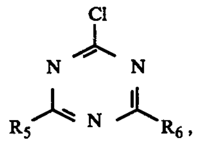

(3.52)

it being possible to obtain the dyestuff of the formula (3.51) by hydrolysing a phthalimide of the formula (3.53)

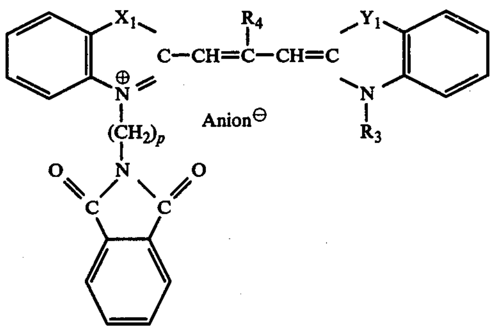

with a hydrogen halide acid. This works particularly well, if p is 3 and hydrobromic acid is used for the hydrolysis.

Dyestuffs of the formula (3.7) can be obtained by quaternisation of cyanine bases of the formula (3.71)

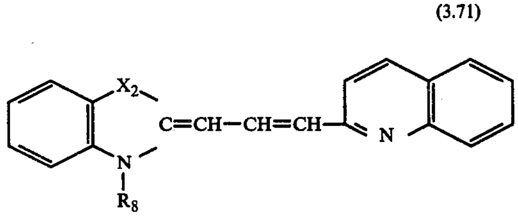

with a chlorotriazine of the formula (3.52).

Dyestuffs of the formula (3.12) are obtained by reacting dyestuffs of the formula (3.121)

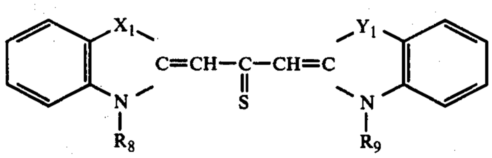

with a chlorotriazine of the formula (3.52).

Finally, dyestuffs of the formula (3.15) can be manufactured from those of the formula (3.515)

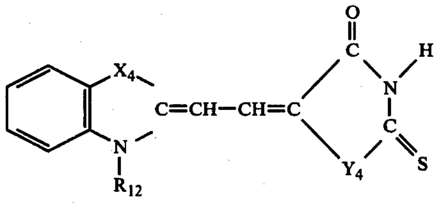

and a chlorotriazine of the formula (3.52). In this case cyanuric chloride is particularly reactive, but dyestuffs of the formula (3.16) also are readily formed.

In the sensitisers according to the invention the radicals of the sensitising dyestuffs are covalently bonded to amino, imino, hydroxyl, mercapto, carboxylic acid or carboxylic acid amide groups of natural hydrophilic colloids. The hydrophilic colloid used for this is above all gelatine. Other hydrophilic colloids having reactive groups, however, can also be used, for example dextranes of bacterial origin, carageenate, alginates, casein, albumen.

Such sensitisers can be manufactured from the sensitising dyestuffs containing reactive groups and the hydrophilic colloids by reaction methods which are in themselves known. In many cases, the dyestuffs contain reactive groups which are similar to those of known hardeners or crosslinking agents for gelatine, so that they readily react with the colloid when they are brought together with the colloid in an aqueous medium at room temperature or slightly elevated temperature, whilst maintaining a suitable pH range, if appropriate. Since the sensitising dyestuffs having the reactive groups are only sparingly soluble in water in some cases, it is advisable to dissolve them beforehand in an organic solvent and to combine them in this form with the aqueous colloid. If necessary, the solvent can be separated off again after completion of the reaction.

Examples of light-sensitive heavy metals which can be used in the materials of the present invention are lead, zinc, cadmium, titanium or silver compounds, such as lead halides, zinc oxide, zinc sulphide, cadmium sulphide or titanium dioxide. Preferred light-sensitive heavy metal compounds are those which are present in the form of a suspension of microcrystals in a solution of the hydrophilic colloid, such as the light-sensitive so-called emulsions customarily used in photography. These are above all materials which contain light-sensitive silver halide, such as bromide, chloride and mixtures of these two, with or without the addition of iodide. In other applications, the light-sensitive heavy metal compound can also be present in the form of larger single crystals or as a vapour deposited thin layer.

The colloid which has been reacted with the dyestuff can at least partially replace the gelatine customarily used for the manufacture of, for example, a light-sensitive silver halide emulsion. In the processes according to the invention, the precipitation of the silver halide is advantageously carried out in the aqueous solution of the colloid which has been reacted with the dyestuff, the microcrystals formed being sensitised in situ.

The aqueous solution of the colloid which has been reacted with dyestuff can, however, also be used for treating the surfaces of single crystals or of vapour-deposited layers free from binder, similar sensitising effects being acheived. It is known that, when such surfaces are treated with aqueous colloid solutions, an adsorptively bonded layer of several hundred Å thickness is formed, which in the case of the present process now no longer consists of pure colloid, but of the reaction product of colloid and dyestuff.

The reaction product of hydrophilic colloid and reactive sensitising dyestuff, prepared by the present process, can be regarded as a colloid provided with a sensitiser effect. Another proposal for manufacturing such a sensitising colloid can be found in U.S. Defensive Publication No. T 896,035. This colloid consists of a polycarbonate in which recurring chromophoric groups, containing a polymethine chain, of the structure

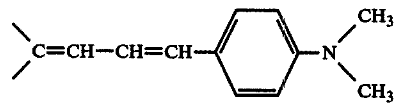

are incorporated. Compared with this publication, the present invention has a substantially wider field of application, since an extensive range of natural hydrophilic colloids, especially gelatine, can be reacted with a large selection of different sensitising dyestuffs, from various classes, modified by the incorporation of a reactive group. The invention is thus provided with a particularly large variability and is especially suitable for the gelatine-containing systems customary in photography.

In the case of single crystals or vapour-deposited layers, the sensitisation of the light-sensitive heavy metal compounds is carried out by brushing or dipping. Microcrystals which are present in suspensions, such as occur in the customary photographic emulsions, can be spectrally sensitised by simple addition of the aqueous solution of the colloid which has been reacted with the reactive dyestuff. Advantageously, however, the microcrystals, for example of silver halides, are produced directly in a solution of the colloid which has been reacted with the dyestuff, the optical sensitisation of the crystals taking place, as already mentioned, during the precipitation and the subsequent physical ripening.

Furthermore, it is possible also to carry out a chemical sensitisation, for example by sulphur, gold or palladium compounds, simultaneously with the optical sensitisation according to the present invention. Furthermore, the photographic emulsions sensitised by the process according to the invention can contain others of the customarily used additives, such as stabilisers, antifogging agents, wetting agents, hardeners and antistatic agents.

A particularly advantageous embodiment results if further sensitising dyestuffs are also used in the customary form, for example as dilute solutions in organic solvents, these dyestuffs being adsorptively bonded to the grain surface in a known manner. The sensitising action of these dyestuffs can here be enhanced by also using the colloid-dyestuff reaction products according to the invention. This mode of application proves particularly advantageous for thin photographic layers. The achievable sensitivity of such layers has in fact been limited hitherto, largely because only a correspondingly small amount of light could be absorbed due to the small amount of adsorbable dyestuff, so that the energy absorption of such layers remained restricted to a relatively low level. The addition of further quantities of sensitising dyestuff so far had to remain ineffective, since the customary sensitising dyestuffs are only effective up to an amount which corresponds to an adsorbed monolayer. Larger amounts which, for example, suffice for a multilayer adsorption can in many cases even have a pronounced desensitising action. The process according to the invention has, however, made it possible to introduce larger than the customary amounts of sensitising dyestuff into the emulsion and thus to intensify the action beyond the previous threshold.

In the same way, additional supersensitisers or, if desired, desensitisers can also be introduced into the photographic emulsions in a known manner, and the effect of the sensitising process according to the invention can be broadened and complemented in the desired way. Examples of supersensitisers which can be used are the compounds described in U.S. Pat. Nos. 3,592,656 and 3,615,633. Further suitable supersensitisers are listed in Photographic Science and Engineering 14, 336 [1970] and 17, 368 [1973], and also in Zeitschrift für Elektrochemie 62, 135 [1958]. A list of supersensitisers can also be found in H. Meier: "Spectral sensitization" (The Focal Press, London + New York 1968), page 89–91. Examples of suitable desensitisers are described in Mees, "Theory of the Photographic Process" (MacMillan, New York 1966), pages 228–230, and also in Z. wiss. Photophysik und Photochemie 59, 113–173 [1965], Z. wiss. Photographie 56, 196 [1962], and in Phot. Science & Engineering 11, 82 [1967].

The heavy metal compounds spectrally sensitised in accordance with the present invention can be employed for the most diverse fields of application of photographic processes: black-and-white reproduction materials which are sensitive in different wavelength ranges, colour photography by chromogenic processes or by the silver dye bleach process, silver complex processes and dye transfer processes, graphic films, lithographic plates, electrophotographic processes and processes with physical development.

A method to combine photographic addenda such as optical brighteners, dyestuffs or even sensitizing compounds to synthetic or semisynthetic polymers, such as acrylic esters or phtalated gelatin by using reactive groups such as azide or carbodi- or -trihalogen groups has been published in British Patent Specification No. 1,352,149.

These compounds are rendered non-diffusible by binding to the polymer and may even be incorporated into gelatine-silver halide emulsions of photographic layers. Instead, according to this invention it is now possible to bind novel sensitising dyestuffs with defined reactive groups directly to unmodified gelatin whereby unexpected and highly advantageous sensitising effects can be created.

According to another aspect of the present invention there is provided a spectral sensitising dinuclear cyanine dye or merocyanine dye which has attached either to a heterocyclic nucleus of the dye or to the methine chain of the dye a group which is reactive with a hydrophilic colloid which contains an SH—, $NH_2$—, NH=, OH, —$CONL_1L_2$ group, where $L_1$ and $L_2$ are each hydrogen atoms or lower alkyl groups or a —COOH group.

Examples of hydrophilic colloids which contain SH—, $NH_2$—, NH=, —OH, —$CONL_1L_2$ or —COOH groups hereinafter referred to as reactable groups are polypeptides, skin tissues, agar-agar, polyvinyl alcohol, casein, albumen, cellulose derivatives such as phthalated cellulose, carboxymethyl cellulose and methyl cellulose as well as hydrophilic homo- or copolymers of acrylic or methacrylic acid and polyvinylpyrrolidone having reactable substituent groups.

By the phrase "a group which is reactive with a hydrophilic colloid which contains a reactable group as hereinbefore defined" which is used hereinafter there is meant a group which is able to react with an SH—, $NH_2$—, NH=, —OH, —$CONL_1L_2$ or —COOH to form a chemical bond.

A large number of such reactive groups are known. Very often such reactive groups occur in compounds which are useful as hydrophilic colloid crosslinking agents. Other reactive groups are those of use for enabling reactive dyes to become substantive to certain textiles. Such groups are set forth in detail in "Reactive Dyes Vol. VI" of the Chemistry of Synthetic Dyes edited by K. Venkataraman, published by the Academic Press in 1972.

One particularly useful class of such reactive groups are those which contain a terminal vinyl group. Examples of such groups have the following formulae:

$-NH-CO-CH=CH_2$, $-CH_2O-CO-NH-CO-CH=CH_2$, $-CH_2-NH-CO-NH-CO-CH=CH_2$, $-NH-CO-CH_2-CH_2-SO_2-CH=CH_2$, $-NH-CH_2-CH_2-SO_2-CH=CH_2$.

A similar class of reactive groups are those having either a chlor-acrylic or brom-acrylic terminal group of the following formulae:

$-NH-CO-CCl=CH_2$ $-NH-CO-CBr=CH_2$

Another useful class of reactive groups are azines, diazines or triazines which have at least one reactive substituent known as a "leaving group". Azines, diazines and triazines which have a leaving group are able to react with hydrophilic colloids having a reactable group. The most useful leaving groups are chlorine, bromine and ammonium or substituted ammonium such as N-methyl-morpholinium. Examples of such reactive groups are azines of the general formula

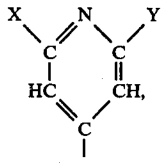

(I)

diazines of the general formula

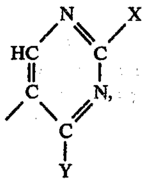

(II)

and triazines of the general formula

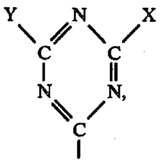

(III)

wherein in the above three formulae at least one of X or Y is a leaving group as hereinbefore defined and the other if not a leaving group is a hydroxy or lower alkoxy group.

A similar class of reactive groups are those of the formula

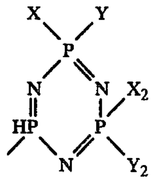

(IV)

wherein at least one of X, $X_2$, Y, or $Y_2$ is leaving group and the others if not leaving group are hydroxy or lower alkoxy groups or hydrogen atoms.

Other heterocyclic reactive groups are benzothiazolyls and quinoxalines which have as a substituent at least one leaving group. In the case of these two heterocyclic compounds the preferred leaving groups are chlorine atoms. Thus two particularly useful reactive groups are chlorobenzthiazolyl which has the formula

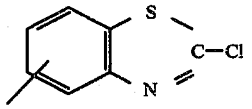

(V)

and 2,3- dichloroquinoxaline which has the formula

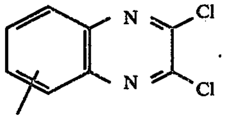

(VI)

Other classes of reactive groups are those which have as a free end group an aldehyde group, an epoxide group, an aziridine group and the isocyanate or isothiocyanate groups themselves or groups which have a free isocyanate or isothiocyanate end group, as well as activated carboxyl groups such as —CO Cl and —CO—O—CO— or activated sulphonyl groups such as —$RSO_2Cl$.

By dinuclear cyanine and merocyanine spectral sensitisers for light sensitive heavy metal compounds are meant dinuclear cyanine and merocyanine dyestuffs which when in contact with the light sensitive heavy metal compound are able to alter the spectral sensitivity of the light sensitive heavy metal compound by altering the spectral absorption curve of the metal compound for example by increasing its light sensitivity to light of a particular wave band and/or by rendering the heavy metal compound sensitive to light of a particular wave band to which it was not initially light sensitive. For example silver halides are sensitive only to blue light but spectral sensitising dyes can be brought into contact with silver halide to render it light sensitive not only to blue light but to green and red light and sensitive to light far into the infra-red region of the spectrum.

Examples of light-sensitive heavy metal compounds are silver halides such as silver chloride, silver bromide and silver iodide and mixtures thereof for example silver iodobromide, lead halide, zinc oxide, zinc sulphide, cadmium sulphide and titanium dioxide.

Each of the metal compounds has its preferred classes of dinuclear cyanine and/or merocyanine spectral sensitisers and such dyes which spectrally sensitise some of these metal compounds will not spectrally sensitise other of these metal compounds. However the term spectral sensitisers can also be used to cover the spectral sensitisation of reversal light-sensitive systems such as direct positive silver halide emulsions in which case the spectral sensitiser when in contact with the silver halide crystals alters their spectral absorption but in fact it can be said to act as a desensitiser in that instead of increasing the photographic speed of the silver halide by passing electrons to the silver halide, it decreases the photographic speed of the silver halide by acting as an electron acceptor.

The term dinuclear cyanine dye used herein is defined in Hamer in "The Cyanine Dyes and Related Compounds" which was published in 1964 by Interscience as one of the Monographs relating to The Chemistry of Heterocyclic Compounds. On page 25 of this book a dinuclear cyanine is defined as a mono-acid salt in which the nitrogen atoms of the two heterocyclic nuclei are linked by a chain of conjugated double bonds so that this chain necessarily consists of an odd number of carbon atoms. The nitrogen atom of one nucleus is tertiary and the other is quaternary. However in this application the term dinuclear cyanine dye includes also azacyanine dyes and diazacyanine dyes, that is to say dyes having two heterocyclic nuclei linked by a chain of conjugated double bonds but wherein in the conjugated chain either one or two of the carbon atoms have been replaced by a nitrogen atom.

The term merocyanine dye as used herein is defined by Hamer in "The Cyanine Dyes and Related Compounds" as nonionic compounds of the structure

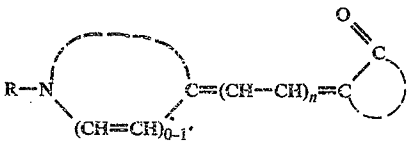

wherein n is 0–3.

Thus the methine chain which links the two nuclei is either a direct link or even numbered.

The novel spectral sensitisers of the present invention are of use as sensitisers for normal negative working silver halide emulsions and in particular for gelatino silver halide emulsions which on exposure and development yield a negative image.

According to a preferred embodiment of the invention there is provided a spectral sensitising dinuclear cyanine dye of the general formula

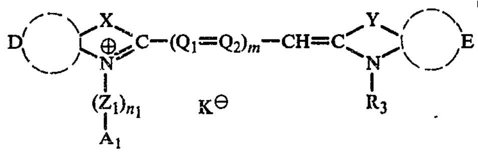
(VII)

or the general formula

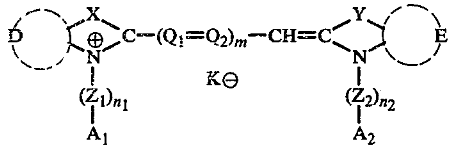
(VIII)

wherein the above two terms X and Y are each $-C(R_1R_2)-$ where $R_1$ and $R_2$ are each hydrogen atoms or lower alkyl groups, —CH=CH—, —O—, —S—, wherein optionally one at least of the carbon may be substituted by lower alkyl group. However, when m is 1 $-(Q_1=Q_2)-$ may represent the linkage —N=CH— or —N=N— that is to say the dyes may be azacyanines or diazacyanines. Preferably in both of formulae (VII) and (VIII) m is 1 and $-(Q_1=Q_2)-$ represents the linkage $-CH=CR_4-$ wherein $R_4$ is a hydrogen atom or an ethyl, a methyl or a phenyl group, that is to say the dyes are dinuclear trimethincyanine dyes.

One class of dyes of formula VII are dyes of the following formula

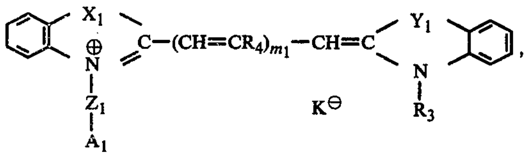
(IX)

wherein $X_1$ and $Y_1$ are each —O—, —S—, —Se— or $-NR_7-$, $m_1$ is 0 or 1, $R_3$, $R_4$, $R_7$, $Z_1$, $A_1$ and K have the meanings assigned to them above.

Particularly useful dyes are obtained when $A_1$ is a triazine nucleus with at least one reactive substituent. Dyes of this type have the general formula

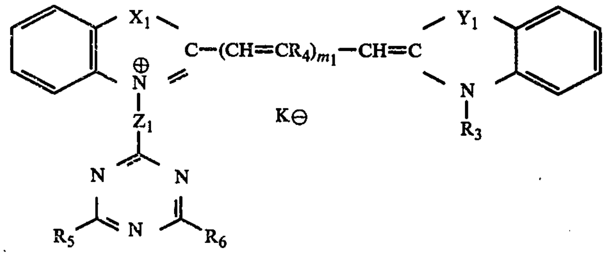
(X)

—Se— or $-NR_7-$, where $R_7$ is a lower alkyl group, D and E each represent the atoms necessary to complete a benzene or naphthalene ring system which may be optionally substituted, m is 0, 1 or 2, $Z_1$ and $Z_2$ are each a linking group, each of $n_1$ and $n_2$ are 0 or 1, $R_3$ is a lower alkyl, lower alkoxy, carboxy lower alkyl or sulpho lower alkyl group, K is an anion, and $A_1$ and $A_2$ are each a group which is reactive with a hydrophilic colwhere at least one of $R_5$ and $R_6$ is a leaving group and the other if not such a group is a hydroxy or a lower alkoxy group, and $X_1$, $Y_1$, $R_3$, $R_4$, $Z_1$, $m_1$ and K have the meanings assigned to them above:

A particularly useful linking group $Z_1$ in dyes of formula (X) is provided by the group $-(CH_2)_p-NH-$ where p is 2-5.

Dyes of this type have the general formula

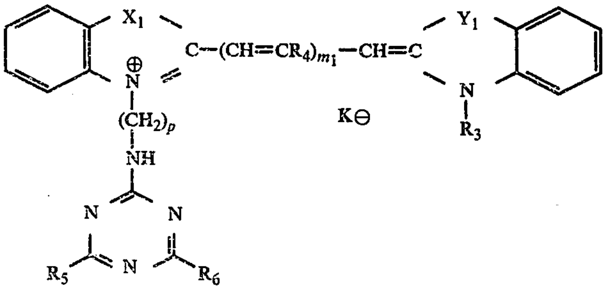
(XI)

loid which contains a reactable group as hereinbefore defined and $-(Q_1=Q_2)-$ represents a conjugated double bond systems.

Preferably in the above two formulae $-(Q_1=Q_2)-$ is a conjugated carbon to carbon double bond system wherein $X_1$, $Y_1$, $R_3$, $R_4$, $R_5$, $R_6$, $m_1$, p and $K^{\ominus}$ have the meanings assigned to them above.

Dyes of formula (XI) may be prepared by reacting a methinecyanine dye of formula

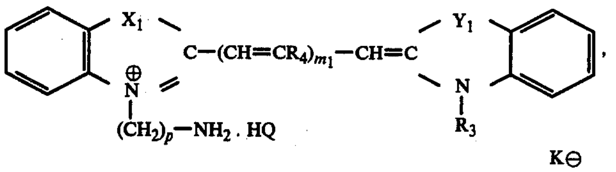

(XII)

wherein $X_1$, $Y_1$, $R_3$, $R_4$, p, $m_1$ and K have the meanings assigned to them above and Q is I, Cl or Br with a triazine of the general formula

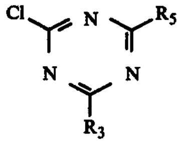

(XIII)

wherein $R_5$ and $R_6$ have the meanings assigned to them above.

Dyes of formula (XII) may be prepared from dyes of the general formula (XIV)

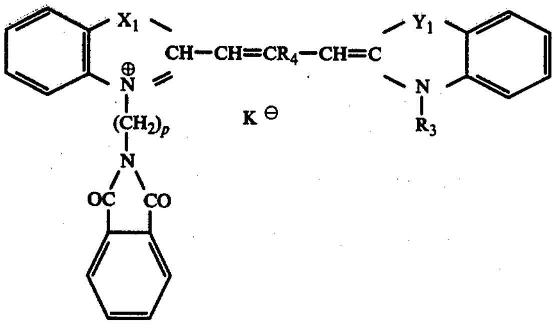

(XIV)

by hydrolysing the dye with a hydrohalo acid.

Another class of dyes of formula (IX) of particular interest are dyes of the general formula

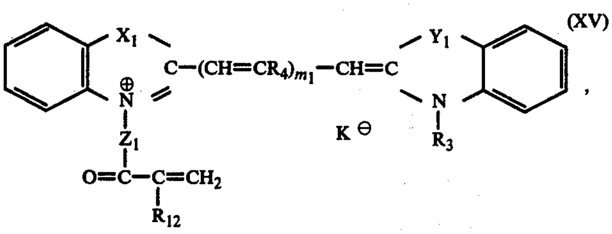

(XV)

wherein $X_1$, $Y_1$, $R_3$, $R_4$, K, $m_1$, and $Z_1$, have the meanings assigned to them and $R_{12}$ is a hydrogen chlorine or bromine atom. Especially preferred dyes of formula (XV) are those wherein both $X_1$ and $Y_1$ are —S—, $R_8$ is a bromine atom, $Z_1$ is a linking group $-(CH_2)_p-NH$ where p is 2-5 and m is 0. (The preparation of a dye of this type is described in Example 11 which follows). And dyes wherein $X_1$ and $Y_1$ are —S—, $Z_1$ is a linking group $-(CH_2)_p-$ where p is 2-5 $R_8$ is a hydrogen atom and m is 1. A preparation of a dye of this type is described in Example 15 which follows.

Yet another class of dyes of formula (IX) of particular interest are dyes of the general formula

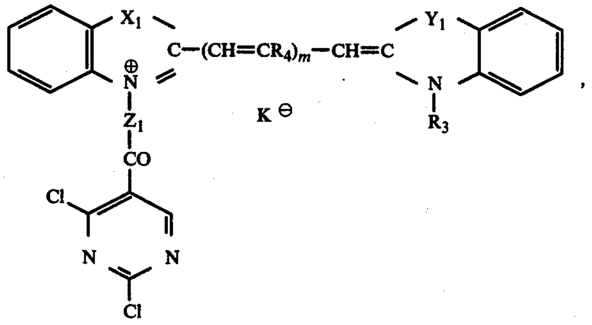

(XVI)

wherein $X_1$, $Y_1$, $R_3$, $R_4$, K, m, and $Z_1$ have the meanings assigned to them above.

Especially preferred dyes of formula (XVI) are those wherein both $X_1$ and $Y_1$ are —S— and $Z_1$ is a linking group $(CH_2)_p-NH-$ where p is 2-5 and m is 0.

The preferred trimethincyanine dyes of formula (XV) may be prepared by reacting a trimethincyanine dye of formula (XII) with the appropriate propionyl chloride. This preparation is described in Example 15.

Monomethincyanine dyes of formulae (XV) may be prepared by reacting a monomethincyanine dye of general formula (XVII)

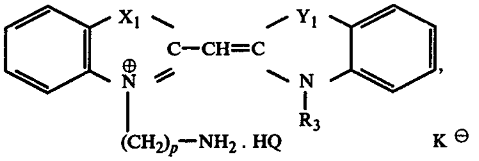

wherein $X_1$, $Y_1$, p, $R_3$ and K have the meanings assigned to them above and Q is I, Cl or Br with the appropriate propionyl chloride. This preparation is described in Example 14.

Dyes of the above formula (XVII) may be prepared from dyes of the general formula (XVIII)

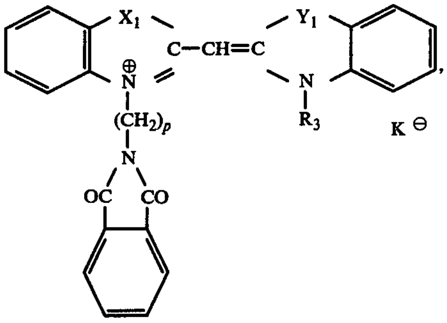

wherein $X_1$, $Y_1$, p, $R_3$ and K have the meaning assigned to them above by hydrolysing the dye with a hydrohalo acid.

The preferred trimethincyanine dyes of formula (XVI) may be prepared by reacting a trimethincyanine dye of formula (XII) with 2,4-dichloropyrimidine-5-carboxylic acid chloride.

Monomethincyanine dyes of formula (XVI) may be prepared by reacting the cyanine dye of formula (XVII) with 2,4-dichloropyrimidine-5-carboxylic acid chloride. This preparation is described in Example 12.

Another class of monomethincyanine dyes of particular interest are dyes of the general formula (XIX)

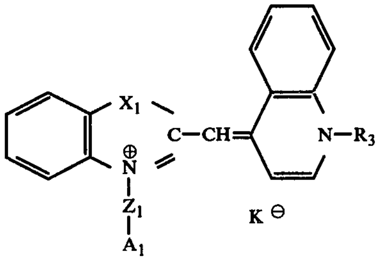

wherein $A_1$, $X_1$, $R_3$, K and Z, have the meanings assigned to them above.

The preferred dyes of formula (XIX) may be prepared by reacting a monomethincyanine dye of the formula (XX)

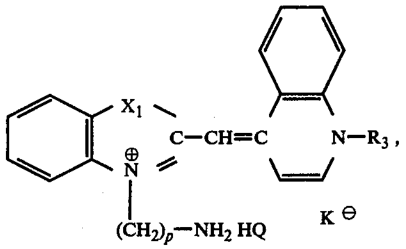

wherein $X_1$, p, $R_3$, Q and K have the meanings assigned to them above with a compound $A_1$—Cl where $A_1$ has the meaning assigned to it above. This preparation is described in Example 11 under (4.12).

The dyes of the above formula XX may be prepared from a dye of the general formula (XXI)

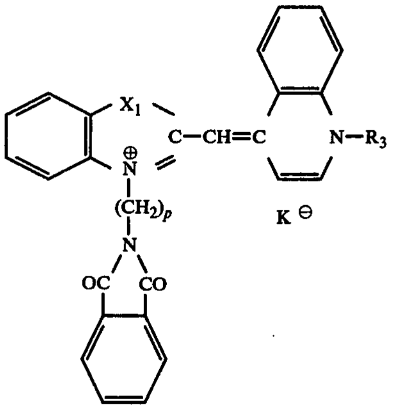

wherein $X_1$, p, $R_3$ and K have the meanings assigned to them above.

The above preparation works particularly well when p is 3 and hydrobromic acid is used.

An example of a dye of formula (XI) and a process for preparing this dye are set forth in Example 6 which follows.

Another class of dyes of formula (VII) or of formula (VIII) are dyes wherein at least one of $n_1$ and $n_2$ is 0. That is to say dyes wherein the reactive group $A_1$ is linked directly to the ring nitrogen of the heterocyclic group.

One specific class of dyes of this type are dyes of the following general formula (XXII)

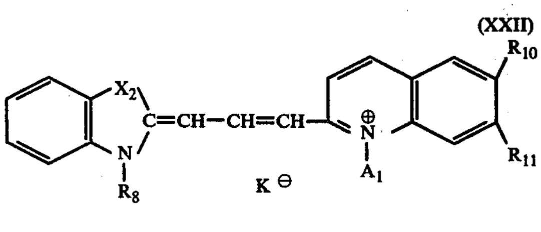

wherein $X_2$ is —O—, —S—, —Se—, —NH— or —$C(R_1R_2)$—, $R_{10}$ and $R_{11}$ are each hydrogen atoms or lower alkyl or lower alkoxy groups, $R_8$ is lower alkyl, lower alkoxy, carboxy-lower alkyl or sulpho-lower alkyl and $A_1$ and $K^{\ominus}$ have the meanings assigned to them above.

A particularly useful dye is obtained when $A_1$ is a triazine nucleus having two leaving groups. Dyes of this type have the general formula (XXIII)

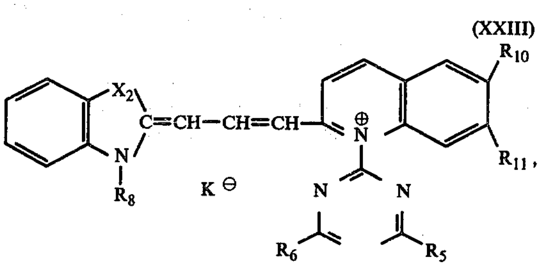

wherein $X_2$, $R_8$, $R_{10}$, $R_{11}$, $K^{\ominus}$, $R_5$ and $R_6$ have the meanings assigned to them above.

Dyes of general formula (XXIII) may be prepared by reacting a cyanine base of the general formula (XXIV)

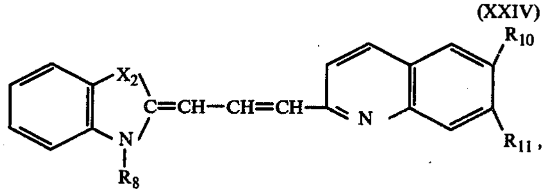

wherein $X_2$, $R_8$, $R_{10}$ and $R_{11}$ have the meanings assigned to them above with a triazine of the general formula (XIII).

The reaction works particularly well and an especially useful dye is obtained when the triazine of formula (XIII) is cyanuric chloride.

A very interesting class of dyes of this type are obtained when $X_2$ in formula (XXIII) is $—C(R_1R_2)—$. Dyes of this type have the general formula (XXV)

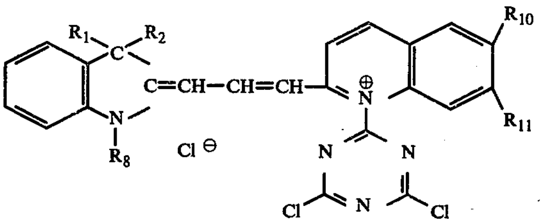

wherein $R_1$, $R_2$, $R_8$, $R_{10}$ and $R_{11}$ have the meanings assigned to them above.

The preparation of a dye of formula (XXV) is set forth hereinafter in Example 13.

According to another embodiment of the invention there is provided a spectral sensitising carbocyanine dye of the general formula (XXVI)

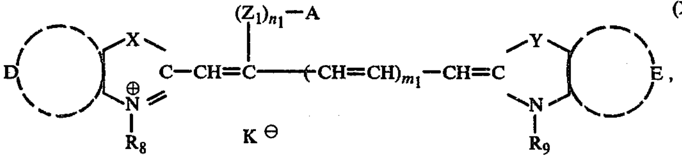

wherein X and Y are each $—C(R_1R_2)—$ wherein $R_1$ and $R_2$ are each a hydrogen or lower alkyl, $—CH{=}CH—$, —O—, —S—, —Se— or $—NR_7—$, D and E each represent the atoms necessary to complete a benzene or naphthalene ring system which may be optionally substituted $m_1$ is 0 or 1, $R_8$ and $R_9$ are each lower alkyl, lower alkoxy alkyl, carboxy lower alkyl or sulpho-lower alkyl groups, $Z_1$ is a linking group, $n_1$ is 0 or 1, K is an anion, A is a group which is reactive with a hydrophilic colloid which contains a reactable group as hereinbefore defined.

Preferred dyes of formula (XXVI) are dyes of the general formula (XXVII)

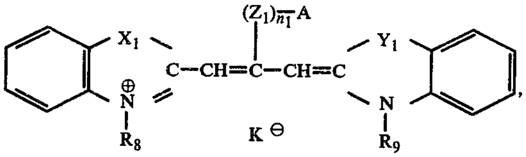

wherein $X_1$ and $Y_1$ are each —O—, —S—, —Se— or $—NR_7—$ and K, $Z_1$, $n_1$, $A_1$, $R_7$, $R_8$ and $R_9$ have the meanings assigned to them above.

Particularly useful dyes are obtained when A is a triazine mucleus having two leaving groups.

Dyes of this type have the general formula (XXVIII)

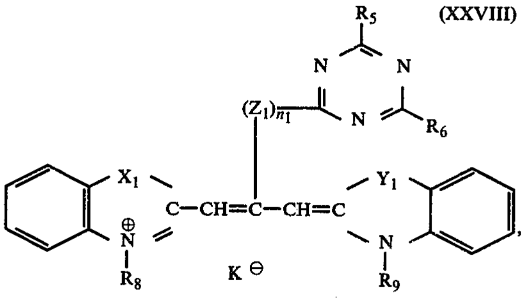

wherein $X_1$, $Y_1$, $Z_1$, $n_1$, $R_5$, $R_6$, $R_8$, $R_9$ and K have the meanings assigned to them above.

In one particular embodiment $Z_1$ is S and $n_1$ is 1. Dyes of this type have the following general formula (XXIX)

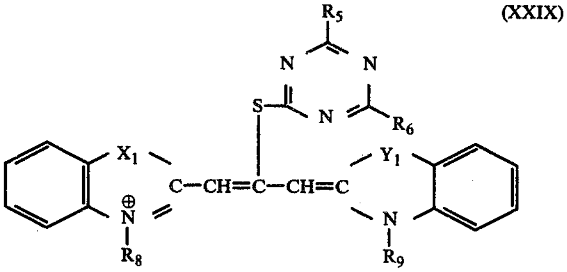

wherein $X_1$, $Y_1$, $R_5$, $R_6$, $R_8$, $R_9$ and K have the meanings assigned to them above.

Dyes of formula (XXIX) may be prepared by reacting a compound of the general formula

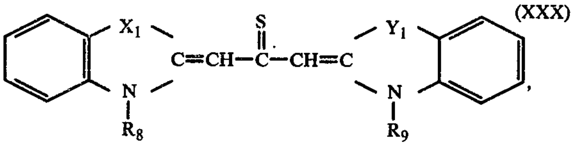
(XXX)

wherein $X_1$, $Y_1$, $R_8$ and $R_9$ have the meanings assigned to them above with a triazine of general formula (XIII) as hereinbefore set forth.

The reaction proceeds particularly well and an especially useful dye is obtained when the triazine of formula (XIII) is cyanuric chloride and in such case in the resulting dye of formula (XXIX) both $R_5$ and $R_6$ are chlorine atoms. An example of a dye of formula (XXIX) and a process for the production of such dyes are given in Example 5 hereinafter set forth.

According to another embodiment of the present invention there is provided a spectral sensitising merocyanine dye of the general formula

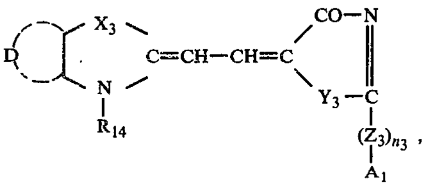
(XXXI)

wherein $X_3$ is $-C(R_1R_2)-$ wherein $R_1$ and $R_2$ are each a hydrogen atom or a lower alkyl group. $-CH{=}CH-$, $-O-$, $-S-$, $-Se-$ or $-NR_7-$ wherein $Y_3$ is $-O-$, $-S-$, $-Se-$ or $-NR_7-$, D represents the atoms necessary to complete a benzene or naphthalene ring system which is optionally substituted, $R_{14}$ is lower alkyl, lower alkoxy, carboxy-lower alkyl or sulpho-lower alkyl, $Z_3$ is a linking group, $n_3$ is 0 or 1 and $A_1$ is a group which is reactive with a hydrophilic colloid which contains a reactable group as hereinbefore defined.

Preferred dyes of formula (XXXI) are dyes of formula

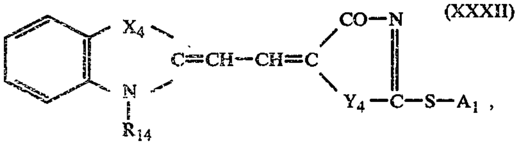
(XXXII)

wherein $X_4$ is $-S-$, $-Se-$, $-NR-$ or $-O-$, $Y_4$ is $-O-$ or $-S-$ and $R_{14}$ and $A_1$ have the meanings assigned to them above.

A particularly useful class of dyes of formula (XXXII) are dyes wherein $A_1$ is a triazine nucleus having two leaving groups. Such dyes have the general formula

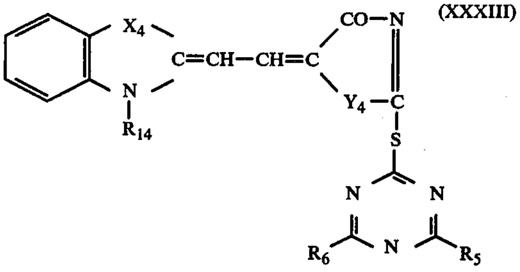
(XXXIII)

wherein $X_4$, $Y_4$, $R_5$, $R_6$ and $R_{14}$ have the meanings assigned to them above.

Dyes of formula (XXXIII) may be prepared by reacting a merocyanine dye of general formula

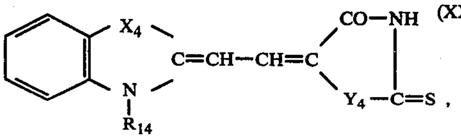
(XXXIV)

wherein $X_4$, $Y_4$ and $R_{14}$ have the meanings assigned to them above with a triazine of the general formula (XIII) as hereinbefore set forth.

The reaction works especially well when the triazine of formula (XIII) is cyanuric chloride.

However, in such case as cyanuric chloride is particularly reactive a bis-merocyanine dye of the following general formula

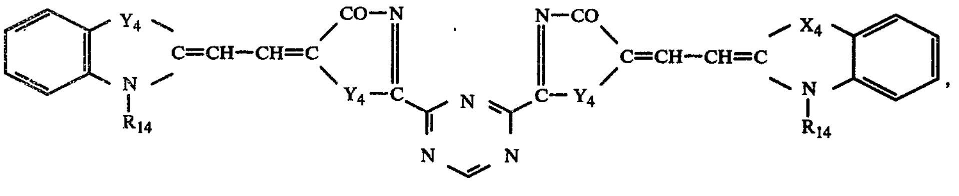
(XXXV)

is often produced wherein $X_4$, $Y_4$ and $R_{14}$ have the meanings assigned to them above.

The preparation of a merocyanine dye of this type is described in Example 1, which follows.

EXAMPLE 1

200 g of a 5% strength gelatine solution are warmed to 45° C. and adjusted to a pH of 8.5 by the addition of dilute sodium hydroxide solution. 73.8 mg (0.1 millimol) of the sensitising dyestuff of the formula

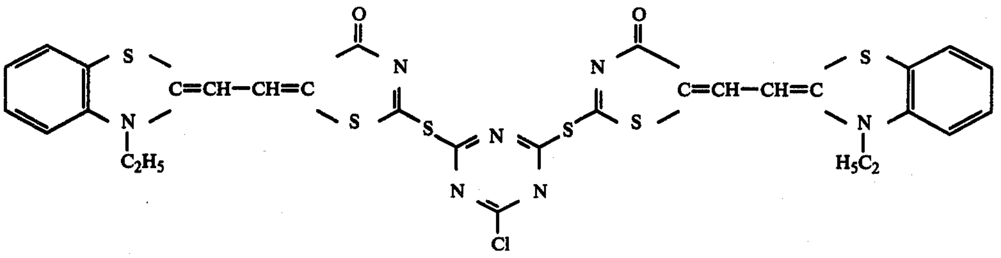
(4.1)

dissolved in 100 ml of trifluoroethanol, are added to this solution over the course of 2 minutes, whilst stirring. After stirring for two hours at 45° C. the temperature is gradually raised to 60° C. and the trifluoroethanol is removed under moderately reduced pressure (about 20 millibars). By adding water, the weight is made up to 200 g and the pH is then adjusted to 4.9 by the addition of 1 molar nitric acid. A completely clear solution is obtained.

In order to prove that the dyestuff has completely reacted with the gelatine and does not diffuse out in an aqueous medium, a sample of the solution is made to flocculate by means of a saturated sodium sulphate solution. After decanting the supernatant colourless solution from the flocculate, the latter is again taken up in water and dialysed through a cellulose acetate membrane until the sulphate ions have disappeared. The bond between the gelatine and the dyestuff can also be proved electrophoretically.

A light-sensitive silver halide emulsion is prepared as follows from the solution containing 5% of gelatine and the sensitising dyestuff bonded to the gelatine: 3 ml of a 1 molar ammonia solution are added to 150 g of the gelatine-dyestuff solution containing 55.35 mg of the bonded dyestuff. 150 ml of a 4 molar silver nitrate solution and 150 ml of a solution containing, per liter, 4 mols of ammonium bromide and 3.2 ml of 25% strength aqueous ammonia are simultaneously added over the course of 70 minutes. Even feed of the two solutions is controlled in such a way that a pAg of 7.0 is maintained during the period of precipitation.

For the purpose of removing the ammonium nitrate formed by the reaction, the emulsion is then flocculated in the usual way, decanted and washed and then again redispersed in ordinary gelatine solution. A customary sulphur-gold ripening is then carried out at 54° C. for 50 minutes. Finally, the completely ripened emulsion is coated onto a polyester base, to give a layer thickness corresponding to 3.5 g of silver per $m^2$, and dried. It is of course necessary to exclude photographically active light during the preparation of the emulsion and the coating and drying. A wedge spectrogram of this material shows a sensitisation between 480 and 650 nm with a maximum at 580 nm. The content of sensitiser, calculated as sensitising dyestuff, is 0.1 millimol per mol of silver bromide; 1/5 th of the sensitiser is lost during the flocculation and subsequent washing.

The dyestuff of the formula (4.1) can be prepared as follows:

22 g of 2-acetanilidovinyl-3-ethylbenzthiazolium iodide and 6.3 g of rhodamine are warmed in 500 ml of methanol under a reflux condenser until a clear solution is formed. 8 ml of triethylamine are slowly added to the boiling solution, and reflux is maintained for a further 2 hours. After cooling for one hour, the dyestuff is separated off, washed with 500 ml of ethanol and 200 ml of chloroform, boiled up with 260 ml of a (10:3) mixture of ethanol and chloroform, filtered off and dried at 60° C. for 24 hours.

1.6 g of the dyestuff, thus obtained, of the formula

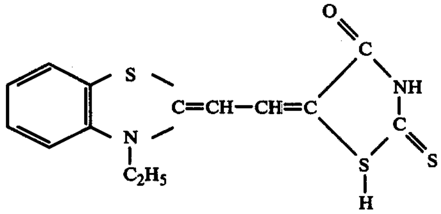
(101.1)

are dissolved in 100 ml of boiling dioxane and carefully added to 300 ml of tetrahydrofurane. After cooling to room temperature, 1 g of cyanuric chloride is added and then 0.7 ml of collidine in 10 ml of tetrahydrofurane is added dropwise over the course of half an hour, whilst stirring. The addition of 1 g of cyanuric chloride and of 0.7 ml of collidine in 10 ml of tetrahydrofurane is repeated. 0.9 ml of triethylamine in 10 ml of tetrahydrofurane is then added and the mixture is stirred for half an hour and poured into 1 liter of acetone. 0.9 ml of triethylamine is added, the mixture is stirred for a quarter of an hour and then 0.9 ml of triethylamine is added once more, the colour of the solution becoming reddish. After leaving to cool overnight to 5° C., about 0.1 g of solid is obtained by filtration, washing with acetone and drying. The dry residue obtained from the filtrate by evaporation under reduced pressure is treated with a (1:1) mixture of acetone and ether, filtered off, washed with ether and then with acetone and dried. About 1 g of crude product is obtained and this is triturated with 50 ml of water, filtered off and thoroughly washed with water, then with acetone and finally with ether. After drying in vauo at 80° C., about 0.25 g of dyestuff of the formula (4.1) remains, which shows an absorption maximum of 525 nm in methanol.

EXAMPLE 2

An emulsion sensitised with the dyestuff, of the formula (4.1), bonded to gelatine is prepared as described in Example 1, the 150 g of emulsion being divided into two equal parts after the redispersion has been carried out, but before the chemical ripening. 6 mg of the dyestuff of the formula

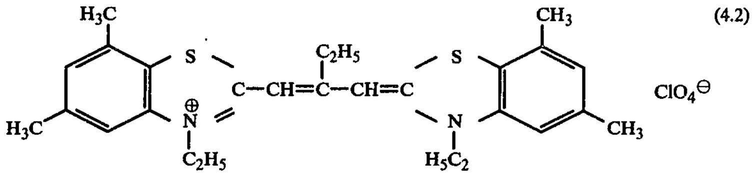

(4.2)

(J. Phot. Science, 22, 159 [1974]) , dissolved in 12 ml of methanol, are added to part A before ripening.

Only 12 ml of methanol are added to part B (control experiment). Both parts are subjected to chemical ripening by the process described in Example 1 and then coated onto a polyester base and dried.

The numerical data listed in the following Tables 1 to 5 have the following meaning:

The first column gives the designation of the emulsion. Columns 2, 3 and 4 give the logarithms to the base 10 of the sensitivity of the particular emulsions under white exposure (tungsten lamp), blue exposure (filter with at most 0.1% transmission at wavelengths between 530 and 710 nm) and minus blue exposure (filter with at most 0.1% transmission at wavelengths below 510 nm).

The value $$\log E\,(-\text{blue}) - \log E\,(\text{blue}) = \frac{E\,(-\text{blue})}{E\,(\text{blue})},$$

which is indicated in the fifth column is relevant for the sensitisation in the spectral range (log E (-blue) for the value log E (blue) = 1).

The sensitivities are indicated in these tables in such a way that smaller numerical values denote higher sensitivities.

Columns 6 and 7 contain the concentrations (in millimol/mol of Ag) of the modified sensitising dyestuffs in gelatine (column 6) and of the additional unmodified sensitising dyestuffs adsorbed on the silver halide (column 7).

The material obtained from part A contains, per mol of silver bromide, 0.1 millimol of chemically bonded dyestuff (4.1) and 0.036 millimol of dyestuff (4.2) adsorbed on silver bromide.

The material obtained from part B is virtually identical to the material obtained in accordance with Example 1 and contains, per mol of silver, 0.1 millimol of the dyestuff (4.1) bonded to gelatine.

It can be seen from Table 1 that the sensitivity of the emulsion A between 480 and 650 nm (maximum at 580 nm) is considerably higher than that of the emulsion B.

TABLE 1

| 1. | log E | | | 5. | Sensitiser, millimols/mol of Ag | |
|---|---|---|---|---|---|---|
| Emulsion | 2. White | 3 Blue | 4. −blue | log E(−blue) −log E(blue) | 6. Bonded to gelatine | 7. Adsorbed on AgBr |
| A | 1.00 | 1.95 | 1.35 | −0.60 | 0.1 | 0.036 |
| B | 1.25 | 2.10 | 1.90 | −0.20 | 0.1 | — |

EXAMPLE 3

154.8 mg = 0.28 millimol of the dyestuff of the formula

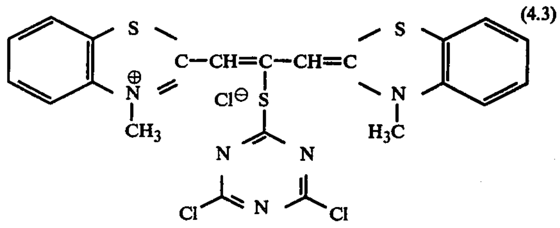

(4.3)

dissolved in 70 ml of trifluoroethanol, are added to 300 g of a 5% strength gelatine solution. The solution is treated as indicated in Example 1. After removing the solvent, likewise as indicated in Example 1, a silver bromide emulsion is prepared as follows from the 5% strength gelatine solution containing the dyestuff:

4 ml of a 1 molar ammonia solution are added, at a temperature of 55° C., to 206 g of the dyestuff-containing gelatine solution which contains 106.3 mg of the bonded dyestuff (4.3). All the following operations are carried out in the dark:

300 ml each of 4 molar silver nitrate solution and 4 molar ammonium bromide solution, 3.2 ml of 25% strength aqueous ammonia solution having been added per liter of the latter, are added simultaneously over the course of 110 minutes.

The feed rates are adjusted to one another in such a way that a constant pAg of 6.5 is maintained.

After the customary flocculation, decanting and washing, the flocculate is redispersed in ordinary gelatine and the resulting emulsion which contains cubic silver bromide crystals, is divided into three equal parts, each of which contains 0.3 mol of silver bromide.

A separate chemical ripening is carried out for each of these three parts, C, D and E, under the conditions described in Example 1. A solution of 60 mg of the dyestuff (4.2) in 120 ml of methanol is added to part C before ripening. Part D is provided with an addition of 15 mg of the dyestuff (4.2) dissolved in 120 ml of methanol. The addition to part E consists of only 120 ml of methanol (control experiment).

Accordingly, the emulsion C contains, per mol of silver bromide, 0.16 millimol of the dyestuff (4.3) as well as 0.364 millimol of the dyestuff (4.2), in a form which can be adsorbed on the surface of the silver bromide grains. The emulsion D contains, per mol, the same amount of dyestuff (4.3) bonded to gelatine and in addition 0.091 millimol of the dyestuff (4.2) adsorbed on the grain surface.

Table 2 shows that a good sensitisation is already obtained for the case of emulsion E, whilst in the case of emulsion D a further increase of the sensitivity can be observed due to the additionally adsorbed dyestuff (4.2).

A marked desensitisation, however, caused by the excessive amount of adsorbed dyestuff (4.2), is demonstrated for emulsion C.

TABLE 2

| 1. Emulsion | Log E 2. white | 3. blue | 4. −blue | 5. Log E(−blue) −Log E(blue) | Sensitiser, mmols/mol of AgBr 6. Dyestuff (4.3) bonded | 7. Dyestuff (4.2) |
|---|---|---|---|---|---|---|
| C | −0.48 | 0.80 | −0.36 | −1.16 | 0.16 | 0.364 |
| D | −0.92 | 0.26 | −0.82 | −1.08 | 0.16 | 0.091 |
| E | −0.26 | 0.36 | 0.10 | −0.26 | 0.16 | — |

The dyestuff of the formula (4.3) can be manufactured by condensing the compound of the formula

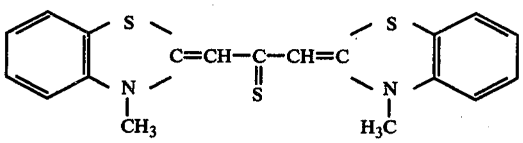

with cyanuric chloride in anhydrous chloroform, as indicated in example 1.

EXAMPLE 4

107 mg (0.2 millimol) of rhodamine B isothiocyanate are dissolved in 80 ml of methanol and reacted with 200 g of a 5% strength gelatine solution in the same way as described in Example 1. 200 g of a 5% strength gelatine solution with bonded dyestuff are obtained. 190 g of this solution, containing 102 mg of the bonded dyestuff, are warmed to 40° C.

A light-sensitive emulsion with cubic silver bromide crystals is then prepared in the dark with the aid of this solution as follows:

20 ml of 1 molar aqueous ammonia solution are first added and then, simultaneously over the course of 60 minutes, 175 ml each of 4 molar silver nitrate solution and of 4 molar ammonium bromide solution, which latter additionally contains 16 ml of 25% strength aqueous ammonia solution per liter. The feed of the two solutions is controlled in such a way that a constant pAg of 7.0 is maintained. After flocculation, decanting and washing the flocculate is taken up in ordinary gelatine. Finally, four samples, F, G, H and I, each of which contains 0.15 mol of silver bromide, are taken from the finished emulsion. The four samples are separately subjected to a chemical ripening according to the process described in Example 1, the following solutions being added thereto:

Part F: 45 ml of methanol
Part G: 7.5 mg of rhodamine B (C.I. 45, 170), dissolved in 45 ml of methanol
Part H: 22.5 mg of rhodamine B, dissolved in 45 ml of methanol
Part I: 7.5 mg of the dyestuff (4.2), Example 1, dissolved in 45 ml of methanol.

The four emulsions each contain 0.27 millimol of rhodamine B isothiocyanate bonded to the gelatine. The emulsions G and H additionally contain 0.104 and 0.0313 millimol respectively of rhodamine B per mol of silver bromide which is bonded adsorptively to the grain surface in the customary manner. In place of the rhodamine B, emulsion I contains 0.091 millimol of the dyestuff (4.2) per mol of silver bromide bonded to the silver bromide grain.

The sensitometric properties of the four emulsions F to I are represented in Table 3.

A silver bromide emulsion with cubic crystals is prepared in the dark from 200 g of a 5% strength solution of ordinary gelatine and 175 ml each of 4 molar silver nitrate solution and of 4 molar ammonium bromide solution containing ammonia, as described in Example 1. A sample which corresponds to an amount of 0.15 mol of silver bromide is taken from the emulsion which has been purified by flocculation, decanting and washing, and again redispersed, and the sample is subjected to chemical ripening as described in this example. 7.5 mg of the dyestuff (4.2), dissolved in 45 ml of methanol, are finally added.

The emulsion designated as J accordingly contains, per mol of silver bromide, 0.091 millimol of the dyestuff (4.2) which is adsorbed at the grain surface. After coating onto a base and drying, the sensitometric properties of the emulsion are measured in the customary manner and entered into Table 3 for comparison with the emulsions F to I.

TABLE 3

| 1. Emulsion | Log E 2. white | 3. blue | 4. −blue | 5. Log E(−blue) −Log E(blue) | Sensitiser, mmol/mol of AgBr 6. Rhodamine B isothiocyanate bonded in the gelatine | 7. Adsorbed dyestuff (4.2) |
|---|---|---|---|---|---|---|
| F | 0.12 | 0.60 | 0.80 | 0.20 | 0.27 | — |
| G | 0.02 | 0.66 | 0.74 | 0.08 | 0.27 | 0.104 Rh.B |
| H | −0.10 | 0.78 | 0.68 | −0.10 | 0.27 | 0.313 Rh.B |
| I | −0.66 | 0.70 | −0.58 | −1.28 | 0.27 | 0.091 (4.2) |
| J | −0.42 | 0.80 | −0.28 | −1.08 | — | 0.091 (4.2) |

It can be seen from Table 3 that, on the one hand, the emulsion I only has a moderate sensitivity and that, on the other hand, the increase in sensitivity achieved by the addition of adsorbed rhodamine B is trivial. The addition of rhodamine B even causes a slight desensitisation in the blue spectral region (emulsions G and H). On addition of adsorbed dyestuff (4.2) (emulsion I), however, a noticeable improvement of the sensitivity is observed, coupled with only a small desensitisation in the blue. The sensitivity of the emulsion I also is noticeably higher than that of the emulsion J (with adsorbed dyestuff only).

EXAMPLE 5

116.2 mg (0.2 millimol) of the dyestuff of the formula (4.4)

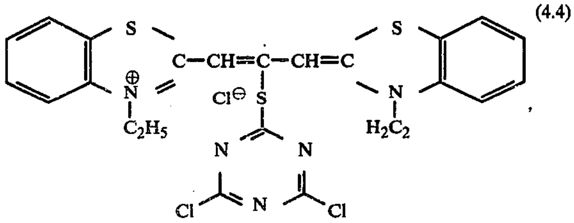

dissolved in 70 ml of trifluoroethanol, are reacted with 200 g of a 5% strength gelatine solution in the same manner as described in Example 1. After removal of the solvent, the gelatine solution containing the dyestuff is made up again to 200 g, corresponding to the original gelatine content of 5%. A sample of 190 g, corresponding to 110 mg of bonded dyestuff (4.4) is taken from this solution. A silver bromide emulsion with cubic crystals is prepared from this sample by the procedure described in Example 4, but using 250 ml each of 4 molar silver nitrate solution and of 4 molar ammonium bromide solution containing ammonia. After the customary purification by flocculation, decanting and washing, a sulphur-gold ripening is carried out at 54° C. for 50 minutes.

The emulsion is then coated onto a polyester base to give a layer thickness corresponding to 3 g of silver per $m^2$, and is dried.

The sensitometric data of this emulsion which contains, per mol of silver bromide, 0.19 millimol of the dyestuff (4.4) is represented in Table 4. It shows a strong sensitisation between 480 and 690 nm.

TABLE 4

| 1. Emulsion | Log E 2. white | 3. blue | 4. −blue | 5. Log E(−blue) −Log E(blue) | Sensitiser, mmol/mol of AgBr 6. In gelatine (4.4) | 7. Adsorbed |
|---|---|---|---|---|---|---|
| K | −0.58 | 0.50 | −0.50 | −1.0 | 0.19 | — |

The dyestuff of the formula (4.4) can be prepared as follows: 1.62 g of the dyestuff of the formula

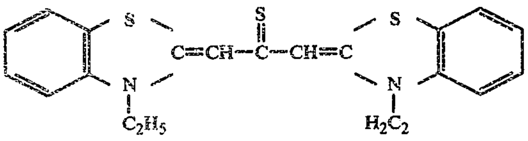

are extracted in a Soxhlet apparatus with 800 ml of dry acetone, until the liquid runs down colourless. 3 g of cyanuric chloride dissolved in 100 ml of acetone are added to the solution cooled to room temperature, whilst stirring. After about 2 hours of further stirring at room temperature, the dyestuff of the formula (4.4) crystallises out. It is filtered off and washed with acetone and then with ether. $\lambda_{max}$ in chloroform at 570 and 610 nm.

EXAMPLE 6

229.3 mg (0.4 millimol) of the dyestuff of the formula (4.5)

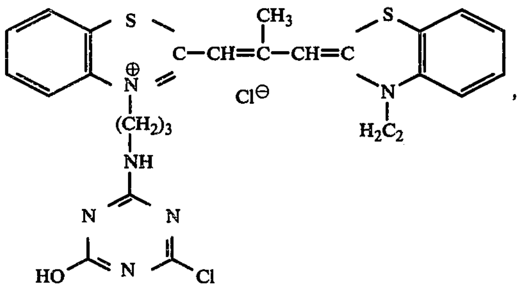

dissolved in 160 ml of methanol, are reacted with 200 g of a 5% strength gelatine solution according to the procedure described in Example 1. After removal of the solvent, the solution is made up again to 200 g with water. A sample of 190 g is taken and a silver bromide emulsion with cubic crystals is prepared therefrom as described in Example 4. After the customary purification by flocculation, decanting and washing, three equal samples, S, T and U, each containing 0.15 mol of silver bromide, are taken. The three samples separately are allowed to ripen chemically, as described in the example, each with the following additions:

Part S: 36 ml of methanol
Part T: 4.4 mg of the dyestuff (4.6), dissolved in 36 ml of methanol
Part U: 17.6 mg of the dyestuff of the formula (4.6)

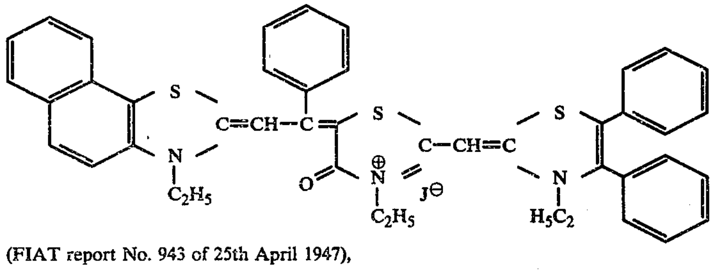

(FIAT report No. 943 of 25th April 1947), dissolved in 36 ml of methanol.

The three emulsions S, T and U each contain 0.54 millimol of the dyestuff (4.5) bonded to gelatine. In addition the emulsions T and U contain, per mol of silver bromide, 0.035 and 0.14 millimol respectively of the dyestuff (4.6) adsorbed on the grain surface. Table 5 reproduces the sensitometric properties of the emulsions S, T and U.

TABLE 5

| 1. Emulsion | Log E 2. white | 3. blue | 4. -blue | 5. Log E (-blue) -Log E (blue) | Sensitiser, mmol/mol of AgBr 6. Bonded to gelatine | 7. Adsorbed |
|---|---|---|---|---|---|---|
| S | −0.75 | 0.60 | −0.68 | −1.28 | 0.54 | — |
| T | −0.84 | 0.58 | −0.76 | −1.34 | 0.54 | 0.035 |

TABLE 5-continued

| 1. Emulsion | Log E 2. white | 3. blue | 4. -blue | 5. Log E (-blue) -Log E (blue) | Sensitiser, mmol/mol of AgBr 6. Bonded to gelatine | 7. Adsorbed |
|---|---|---|---|---|---|---|
| U | −0.86 | 0.64 | −0.80 | −1.44 | 0.54 | 0.140 |

The dyestuff of the formula (4.5) can be manufactured as follows:

9.2 g of 2-methyl-3-(3-phthalimidopropyl)-benzthiazolium bromide and 7.3 g of 3-ethyl-2-(2-methylthio)-prop-1-enyl-benzthiazolium methyl sulphate in 250 of ethanol are boiled under a reflux condenser, until a clear solution is formed. After cooling to room temperature, 5 ml of triethylamine are added to this solution. After further stirring for a quarter of an hour, the mixture is gradually warmed and then held for one hour at the boil under reflux. After cooling for two hours, the dyestuff is filtered off, washed with ethanol and ether and finally dried.

A solution of 2 g of the phthalimidopropyl dyestuff, thus obtained, of the formula

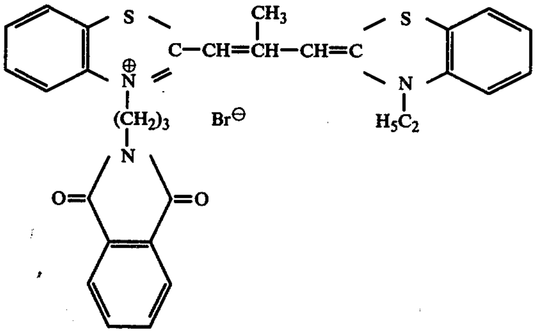

in 25 ml of 46% strength hydrobromic acid and 8 ml of water is boiled for 4½ hours under a reflux condenser, whilst stirring. The clear red solution obtained on pouring out into water is treated with a solution of 18 g of sodium acetate in 100 ml of water, whilst stirring. The dyestuff which has precipitated is filtered off, washed with water and dried. It now contains a $HBr.H_2N$— group (aminopropyl dyestuff) in place of the phthalimide radical.

A mixture of 6.6 g of cyanuric chloride and 9.0 g of sodium bicarbonate in 350 ml of water is stirred at 33° C. until virtually everything is in solution, which takes about 2 hours. After the small amount of insoluble residues has been filtered off, a solution of the aminopropyl dyestuff in 7 ml of water and 3 ml of 35.4% strength hydrochloric acid are added dropwise. After completion of the addition, the mixture is stirred for one hour at 30° C. and a further 3.5 g of sodium bicarbonate in 50 ml of water are added and the red solution is stirred for a further hour at 30° C. The acetone is then destilled off under reduced pressure and at below 30° C., and the reaction mixture is left to stand overnight. The dyestuff of the formula (4.5) is filtered off, washed with three times 20 ml of water and dried in vacuo. $\lambda_{max}$ in methanol at 512 and 546 nm.

EXAMPLE 7

The dyestuff of the formula (4.4) which absorbs in the green and red spectral region, see Example 5, is reacted with gelatine according to the procedure described in Example 1. After removal of the solvent the gelatine is purified by dialysis.

One half of a single crystal of highly pure silver bromide, prepared by the method described in DT-OS No. 2,341,534, is contacted with the dyestuff-gelatine solution by brief dipping. The other half of the crystal surface remains untreated. After drying, a 0.5 mm wide slit image is projected, using an intensity of illumination of 250 lux for 1 minute, onto this crystal surface behind an orange filter of opal glass with a steep absorption edge towards wavelengths shorter than 530 nm, one half of the image falling onto the treated part of the crystal surface and the other half onto the untreated part. After the exposure the crystal is washed with highly pure water for 2 minutes, in order to remove the gelatine layer.

For the purpose of laying the latent internal image bare, the crystal is then slightly etched for one minute by means of saturated potassium bromide solution and then rinsed with highly pure water. Two solutions are prepared, and mixed immediately before use, for the subsequent physical development:

Solution A
- 170 ml of ethanol
- 30 ml of doubly distilled water
- 6 g of citric acid
- 0.4 g of 1-methylamino-4-hydroxybenzene Solution B
- 5% strength aqueous solution of highly pure silver nitrate.

The physical development takes place for 8 minutes in a mixture of 20 ml of solution A and 0.5 ml of solution B.

After developing, the slit image appears as a silver image of mirror reflectance wherever the gelatine-dyestuff solution had been in contact with the silver bromide single crystal, but not on the untreated part of the crystal surface.

EXAMPLE 8

A gelatine solution, which has been modified by an addition reaction with the dyestuff of the formula (4.1), Example 1, and purified, and which contains, per kg. 50 g of gelatine and 369 mg of dyestuff, is prepared as described in Example 1. An object slide of glass, which has been covered, by vapour-deposition, with a 1.5μ thick layer of highly pure silver bromide, is first chemically sensitised by dipping for 5 minutes into an aqueous solution of 20 ppm of $Na_3Au(S_2O_3)_2$, 20 ppm of iridium chloride ($IrCl_3$) and 500 ppm of gelatine and thereafter spectrally sensitised by brief dipping at 40° C. into the above dyestuff-gelatine solution, in such a way that only one half of the vapour-plated surface comes into contact with the liquid. The boundary line runs along the central axis of the object slide, parallel to the longer side of the rectangle.

The object slide is then exposed behind a grey step wedge (Δd = 0.3) for 1 millisecond by means of an electronic flash gun behind two identical superimposed orange filters (transmission less than 0.1% at wavelengths below 550 nm) at a distance of 20 cm. It is then developed for 1.5 minutes at room temperature with a solution of 0.67 g of methylamino-4-hydroxybenzene, 26.00 g of anhydrous sodium sulphite, 2.50 g of hydroquinone, 26.00 g of anhydrous sodium carbonate, 0.67 g of potassium bromide and 1.67 g of gelatine in 950 ml of water. A developed silver image of the grey wedge appears in those areas of the vapour-deposited layer, which had previously been contacted with the dyestuff-gelatine solution, whilst no image appears in the untreated areas.

In contrast to comparative tests, in which dyestuffs, for example (4.2), which can be adsorbed on silver bromide are used, absolutely fog-free images are produced on the vapour-deposited silver bromide when using the dyestuff (4.1) bonded to gelatine.

EXAMPLE 9

(a) The procedure followed is exactly as in Example 8, except that 553 mg (0.001 mol) of the dyestuff (4.3) per kg of 5% strength gelatine are employed in place of dyestuff (4.1). Contact between the silver bromide and the dyed gelatine is maintained for 10 minutes. After exposure with 4 electronic flashes, as in Example 7, and chemical development (see Example 8), a silver image of the projected grey wedge is produced, 4 *steps* being visible.

(b) The procedure followed here is exactly as in 9 (a), except that 9 mg of the dyestuff (4.7) of the formula (4.7)

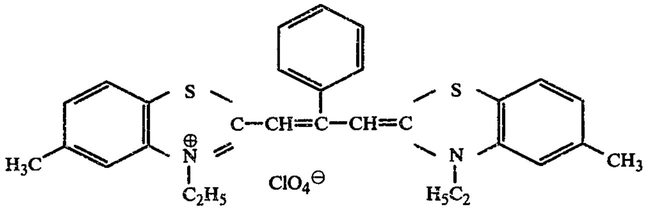

are also added to the mixture of gelatine and dyestuff (4.2).

The contact between the silver bromide and the dyed gelatine lasts for 10 minutes. After exposure with 4 electronic flashes (exactly as described under 9 (a)) and chemical development, a silver image of the projected grey wedge is produced, 5 steps, however, now being visible. Since the grey wedge used is graded in 0.3 density units, this means a doubling of the sensitivity in the case 9(b) as compared with 9(a).

(c) The procedure followed is exactly as in the experiments 9(a) and 9(b), except that 9 mg of the dyestuff (4.7) are now added to fresh, undyed gelatine and the latter is left in contact with the vapour-deposited layer of silver bromide for 10 minutes. Exposure and developing are then carried out as described in 9(a) and 9(b). The developed image of the projected grey wedge now has 4 steps.

Thus, this shows a marked increase in sensitivity with the dyestuff mixture 9(b) as compared with 9(a) and 9(c), in which either the dyestuff (4.3) alone or the dyestuff (4.7) alone was employed under exactly the same conditions.

EXAMPLE 10

(a) The procedure followed is as in Example 8, leaving a vapour-deposited, chemically sensitised layer of silver bromide for 5 minutes in contact with a gelatine which contains 553 mg of bonded dyestuff (4.3).

The sensitised layer is then exposed, behind a grey step wedge, four times by means of an electronic flash, at a distance of 20 cm and behind two filters (1. transmission at most 0.1% at wavelengths between 400 and 660 nm and 2. transmission at most 0.1% at wavelengths between 530 and 710 nm). This corresponds to an exposure in the blue spectral region, only the characteristic absorption of the silver bromide (up to 500 nm maximum) playing a part.

After treating as in Example 9 and chemical development (see Example 8) a silver image of the exposed grey wedge is produced, 9 steps being visible.

(b) The procedure followed is exactly as in Example 10(a) but in such a way that the gelatine used now contains 5.7 mg of the dyestuff of the formula (4.7) per kg of 5% strength gelatine instead of the dyestuff (4.3).

After exposure in the blue spectral region, as described in 10(a), and after chemical development (as in Example 8), the developed silver image of the projected grey wedge is produced. This contains, however, only 5 steps.

Example 10(a) shows that, even at high concentrations of the dyestuff (4.3) bonded to gelatine, substantially less desensitisation can be observed in the region of the characteristic absorption of silver bromide than in the case of conventional spectral sensitisers, such as the dyestuff of the formula (4.7), Example 10(b).

EXAMPLE 11

(a) A gelatine solution which contains the dyestuff of the formula

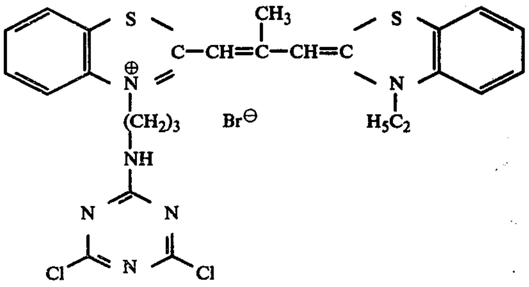

(4.8)

bound by covalent bonds to the gelatine is prepared as follows: 2 g of the sensitiser dyestuff (4.8) (3.14 mmol) are dissolved in 200 ml of N-methylformamide and the solution is added, at a temperature of 45° C., to 20 g of a 10% strength gelatine solution. The pH of the mixture is adjusted to 10 by adding 1 normal sodium hydroxide solution and the mixture is then stirred for a further 2 hours at 45° C. Thereafter the mixture is gradually cooled to −15° C. and is flocculated, at a pH of 5.0, by means of acetone. The flocculate is taken up in water and the flocculation is repeated twice more. For further purification, the solution last obtained passes through a chromatography column with a dextran of bacterial origin modified by cross-linking of the linear macromolecules (SEPHADEX of Pharmacia Fine Chemicals AB, Uppsala). An 0.5 molar sodium chloride solution adjusted to pH 3 by means of hydrochloric acid is used for elution. Finally, the eluate is dialysed until the chloride ions have disappeared completely and is then freeze-dried. The product obtained contains 0.11 mmols of the dyestuff (4.8) per g of dried gelatine. An analysis by means of gel chromatography no longer shows any detectable traces of free dyestuff.

A 4% strength aqueous solution which contains 4.4 mmol of the bound dyestuff (4.8) per liter is prepared from the gelatine preparation containing dyestuff. Thereafter the procedure of Example 8 is followed, by slowly dipping a silver bromide layer, which has been vapour-deposited on a carrier and been chemically sensitised, into this solution at 40° C., and lifting it out again.

The layer, which has now been optically sensitised, is now exposed behind a grey step wedge (d = 0.3) and two superposed orange filters which below a wavelength of 530 nm have a transmission of less than 0.1%, at a distance of 20 cm by means of an electronic flash for 1 millisecond. The latent image is developed in the same way as in Example 8 for minutes at room temperature and a silver image of the step wedge, with 8 visible steps, is obtained.

(b) The same result is achieved if in place of the dyestuff (4.8), which has been bound to gelatine as described above, the sensitiser dyestuff of the formula

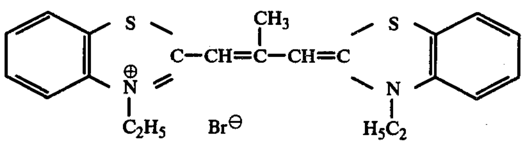

(4.9)

which has not been bound to gelatine is used in an aqueous solution containing 35% of methanol. In that case the sensitisation is carried out by customary adsorption, the vapour-deposited silver bromide layer being dipped for about 5 minutes into a solution containing 0.01 mmol per liter of the dyestuff (4.9).

(c) If the two treatments (a) and (b) described above are combined by treating the vapour-deposited layer first adsorptively with the aqueous methanolic solution of the dyestuff (4.9) and thereafter by brief dipping into the gelatine solution described above, containing the dyestuff (4.8) in bound form, a silver image is obtained, after exposure, in which 9 steps are visible, corresponding to a sensitivity increase by a factor of 2.

The same results as described above under (a), (b) and (c) are obtained if instead of the dyestuff (4.8) one of the dyestuffs of the formulae

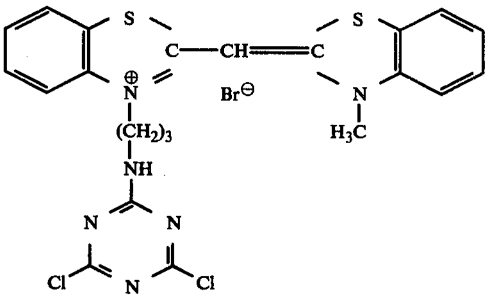

(4.10)

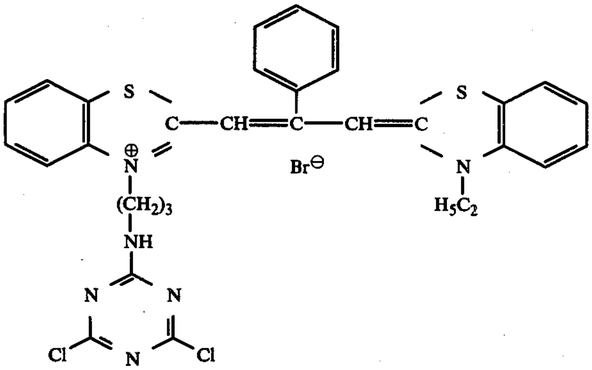

(4.11)

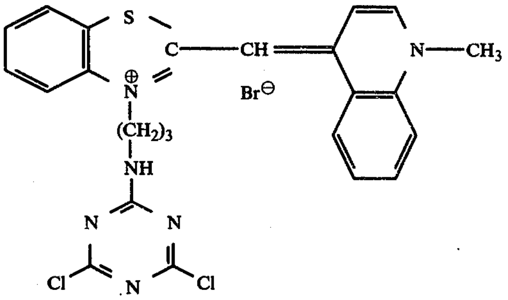

(4.12)

is reacted with gelatine and used for sensitising the vapour-deposited layer according to (a) and the corresponding ethyl homologues which in place of the reactive dichlorotriazinyl group R contain an ethyl group are used for the treatment described under (b).

The reactive dyestuffs used in this example for the reaction with gelatine can be prepared as follows:

Reactive Dyestuff (4.8)

1.0 g of the amino-propyl dyestuff (3-Ethyl-2-benzothiazole) (3-(3-aminopropyl)-2-benzothiazole) β-methyl trimethincyanine bromide hydrobromide, whose preparation was described in the last alinea but one of the foregoing example 6, was dissolved in 48% hydrobromic acid (2 ml) and water (4 ml) by warming on a steam bath. The clear solution was diluted with 2,2,2-trifluoroethanol (15 ml) and cooled to 0° C. in an icebath. The stirred solution was cautiously neturalised with a solution prepared from anhydrous sodium carbonate (1 g) and water (5 ml) and the pink solution was treated with cyanuric chloride (2 g) at 0° C. The resulting mixture was stirred for 5 minutes and was treated with more sodium carbonate (0.8 g) in water (5 ml). Whilst maintaining this temperature more cyanuric chloride (0.5 g) was added and the mixture was stirred for an additional period of 10 minutes.

The deep violet solution containing some suspended matter, was stirred at 10° C. for 1 hour (pH 7 to 8 on paper). After this period acetone (80 ml) was added to the solution which was poured into a solution of sodium hydrogen carbonate (2.5 g) in water (100 ml). Evaporation of the organic solvent under reduced pressure (bath temperature 30° C.) afforded a gummy solid in theaqueous solution. The aqueous solution was diluted with water (100 ml) and refrigerated. The dark brown solid was filtered off and washed well with water (3 × 50 ml). The dye was triturated with acetone (40 ml) for a period of 10 minutes an the suspension was diluted with other (150 ml). The dye was filtered off, washed with ether and dried.

Yield 0.95 g (85 %) reactive dyestuff of formula (4.8).

M.P. 292° C., sintered at 138° C. $\lambda_{max}$ (acetonitrile) 543 nm.

Reactive dyestuff (4.10)

A solution of 2-methyl-3-(3-phthalimidopropyl)benzothiazolium bromide (20.8 g, 0.05 M) in boiling ethanol (500 ml) was treated with a solution of 2-ethylmercapto-3-methyl benzothiazolium toluene- sulphonate (18.3 g, 0.05M). The resulting clear solution was cooled to room temperature. Triethylamine (20 ml) was added to the stirred solution over a period of 2 minutes and the dark solution was stirred at room temperature for a period of 10 minutes. A crystalline yellow solid deposited. The mixture was stirred and heated under reflux for a period of 1 hour. The dye was filtered from the boiling solution washed with methanol (3 × 75 ml) and dried.

Yield: 17 g dyestuff of formula

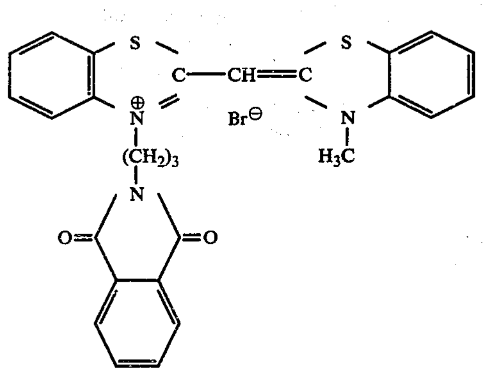

M.p. 275 -278° C. (decomp.) $\lambda_{max}$(methanol) 424 nm

The phthalimido dye (6.0 g) was treated with hydrobromic acid (48%, 93 ml) and water (18 ml) and the resulting mixture was stirred and heated under reflux until a clear solution was obtained. The clear solution was heated under reflux for an additional period of 2 hours. Upon cooling the solution to room temperature a yellow solid deposited. The mixture was triturated with acetone (450 ml) and the dye was filtered off, washed with acetone (2 × 50 ml) and dried under vacuum.

Yield 6.0 g of amino-propyl dyestuff M.p. 309 - 310° C. (decomp.)

$\lambda_{max}$ (methanol) 422 nm

The foregoing aminopropyl dye (0.84 g) was treated with 43% hydrobromic acid (2 ml) and water (1 ml). The suspension was treated with 2,2,2-trifluoroethanol (30 ml) and the mixture was heated under reflux on a steambath until a clear solution was obtained. The warm solution (51° C.) was stirred and cautiously neutralised with anhydrous sodium carbonate (1.2 g) in water (5 ml). After the addition of ca 4 ml of sodium carbonate solution, the resulting clear yellow solution was cooled to 5° C. in an ice-bath. The turbid solution was treated with cyanuric chloride (2 g) and the remainder of the sodium carbonate solution.

The pale yellow turbid solution was stirred for 5 minutes at 0 to 5° C. and was treated with more anhydrous sodium carbonate (0.3 g) in water (8 ml). The resulting mixture was stirred at 5° C. for a period of 0.25 hours (pH 8.0) and was diluted with a mixture of acetone/water (1:1, 40 ml). The mixture was poured into a solution of sodium hydrogen carbonate (3 g) in water (40 ml). Evaporation of the organic solvent under reduced pressure (bath temperature 30° C.) afforded a yellow solid in the aqueous phase. The dye was filtered off, washed with water (3 × 50 ml), triturated with acetone (25 ml) and the acetone solution was diluted with ether (150 ml). The solid was filtered off, washed with ether and dried.

Yield : 0.82 g of reactive dyestuff (4.10)

M.p. 279-284° C. (decomp.)

$\lambda_{max}$ 423 nm (acetonitrile)

Reactive dyestuff (4.11)

A solution of 2-methyl-3-(3-phthalimidopropyl) benzothiazolium bromide (8.82 g) in boiling ethanol (225 ml) was cooled to 40° C. and treated with 2-(β-chlorostyryl-3-ethyl) benzothiazolium chloride (12.2 g). The clear solution was treated with triethylamine (6 ml) and was gently heated under reflux for 1 hour. The solution on cooling at 0° C. did not furnish a solid. Aqueous sodium bromide (10%, 150 ml) was added to the ethanolic solution which was evaporated under reduced pressure to eliminate the organic solvent. The aqueous solution deposited a tar which was separated by decantation. The tar was washed with water (500 ml). Attempts to crystallise the tar were unsuccessful.

Consequently, the tar was treated with 48% hydrobromid acid (170 ml) and water (60 ml) and the resulting mixture was stirred and heated under reflux for a period of 2½ hours. The clear solution was poured into a solution of sodium acetate (prepared from 220 g $CH_3COONa.3H_2O$ and 800 ml water) and the solution was refrigerated overnight. The dye was filtered off, washed with water (50 ml), boiled in ethanol (100 ml) and the solution was diluted with ether (1 liter). The dye was filtered off, washed with ether (200 ml) and dried.

Yield: 13.7 g of the amino-propyl dyestuff of the formula

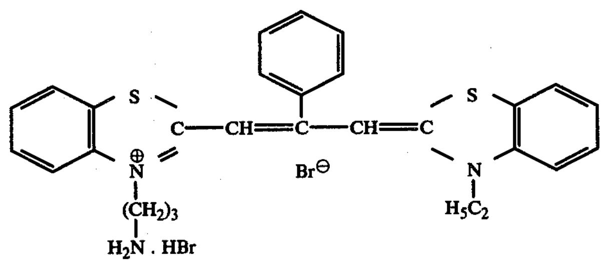

M.p. 187–192° C.
$\lambda_{max}$ 560 nm (methanol)

The foregoing aminopropyl dye (3.0 g) was dissolved in 48% hydrobromic acid (6 ml) at room temperature. The clear solution was diluted with water (3 ml) and 2,2,2-trifluoroethanol (40 ml). The resulting solution was cooled to 0° C. in an ice bath. To the stirred solution aqueous sodium carbonate (12 ml, prepared from 3.9 g anhydrous sodium carbonate and water (15 ml) was added slowly. The vigorously stirred solution was treated with cyanuric chloride (3.7 g) and the remainder of the sodium carbonate solution (3 ml) at 0° C.

The resulting solution was stirred for 3 minutes and was treated with more sodium carbonate (1 g). Stirring was continued at 0° C. for a period of 5 minutes after which time water (5 ml) was added. The dark violet solution was stirred for 10 minutes at 0° C. treated with more water (20 ml) and the resulting solution was stirred for a further period of 10 minutes at 4° C. The solution was treated with acetone (75 ml) and was poured into a solution of sodium hydrogen carbonate (2 g) in water (50 ml) contained in a round bottom flask. Evaporation of the organic solvent under reduced pressure (bath temperature 30° C.) afforded the dye in the aqueous solution. The dye was filtered off, washed with water (50 ml).

The dye was dissolved in boiling acetone (60 ml) and the solution was filtered. The filtrate was diluted with ether (500 ml). After cooling the solution to 10° C., the dye was filtered off, washed with ether and dried.

Yield: 1.4 g of the reactive dyestuff (4.11)
M.p. 219° C. (decomp.), sintered at 163° C.

Reactive dyestuff (4.12)

A solution of 2-methyl-3-(3-phthalimidopropyl) benzothiazolium bromide (13.8 g) in boiling ethanol (345 ml) was stirred and treated with 1-methyl-4-methylthio quinolinium methylsulphate (10 g) and the clear solution was allowed to cool to 30° C. The mixture was treated with triethylamine (13 ml) and the temperature was gently raised to reflux. The dark orange solution was stirred and heated under reflux for 1 hour and the solution was refrigerated for 2 hours at 0° C. The orange dye was filtered off, washed well with ethanol, then with ether. The dye was dried at 50° C.

Yield: 14.3 g of the phthalimido dye of the formula

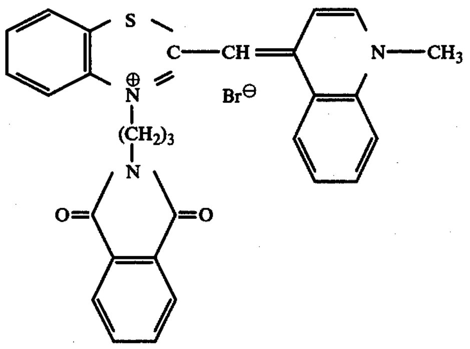

M.p. 281–282° C.
$\lambda_{max}$ 502 nm (methanol)

The foregoing phthalimido dye (14 g) was treated with 48% hydrobromic acid (170 ml) and water (60 ml) and the solution was stirred and heated under reflux for a period of 4 hours. The acidic solution was poured into a solution of sodium acetate (prepared from 220 g $CH_3COONa.3H_2O$ and water (1 liter). The dye precipitated on cooling the solution. The orange dye was filtered off, washed well with water, then acetone, and finally ether. The solid was dried under vacuum over KOH.

Yield: 12.3 g of phthalimido dye
M.p. 264–265° C. (decomp)
$\lambda_{max}$ 502 nm (methanol)

The aminopropyl dye (2.0 g) was dissolved in 48% hydrobromic acid (2 ml) and water (1 ml) by warming on a steam-bath. The clear solution was treated with 2,2,2-trifluoroethanol (40 ml) and the resulting solution was stirred and cooled to 0° C. in an ice-bath. The solution was cautiously treated with aqueous sodium carbonate (4 ml, prepared from 1.3 g anhydrous sodium carbonate and 5 ml water) over a period of 5 minutes. Whilst maintaining this temperature cyanuric chloride (2.7 g) was added whereupon a gelatinous solid deposited. This was followed by the addition of the remainder of the sodium carbonate solution. The mixture was stirred and treated with more sodium carbonate (0.3 g) in water (3 ml). After the addition of the sodium carbonate solution, the mixture became less viscous and could be stirred more easily at 0° C. Water (5 ml) was added and the mixture was stirred at 4° C. for a period of 10 minutes. More sodium carbonate (0.8 g) in water (3 ml) was added to the mixture at 0° C. to 4° C. and the stirring was continued for an additional period of 5 minutes. A mixture of acetone/water (3:4, 70 ml) was added to the dye solution which was stirred at room temperature for a period of 5 minutes. Evaporation of the organic solvent under reduced pressure (bath temperature 30° C.) afforded a dye in the aqueous solution. The dye was filtered from the aqueous solution (pH 4.0), triturated for 5 hours with 1% aqueous sodium hydrogen carbonate (200 ml), filtered and washed with water (3 × 50 ml)

Finally, the orange dye was triturated for 5 minutes with acetone (50 ml) and the mixture was diluted with ether (150 ml), stirred for a period of 10 minutes. The dye was filtered off, washed with ether (2 × 50 ml) and dried.

Yield: 2.1 g of reactive dyestuff (4.12)

M.p. 190–194° C. (decomp), sintered at 164° C.

$\lambda_{max}$ 501 nm (acetonitrile)

The following examples 12–16 concern the preparation of some more reactive dyes, which, according to the foregoing examples 1–11 may be reacted with a hydrophilic colloid, preferably gelatin and used to sensitise light-sensitive heavy metal compounds.

EXAMPLE 12

The reactive dyestuff of the formula (4.13)

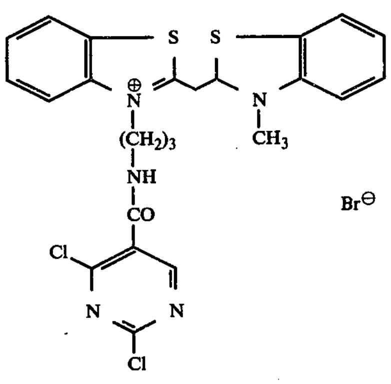

is prepared by reacting the aminopropyl dye used as a starting material for the preparation of compound (4.10) in example 11 with 2,4-dichloropyrimidine-5-carboxylic acid chloride in the following manner:

2.06 g of the aminopropyl dye were dissolved in 200 ml of water and 40 ml of acetone. The $P_H$ of the solution was adjusted to 4 by adding sodium-hydrogencarbonate solution. At 5° C. 10.2 g of 2,4-dichloropyrimidine-5-carboxylic acid chloride in 30 ml acetone was added over 35 minutes keeping the $P_H$ at 4. The mixture was stirred for 20 minutes, the precipitate was filtered, washed with water, acetone and ether and dried in vacuo.

Yield: 0.8 g $\lambda_{max}$ (methanol)=425 nm

EXAMPLE 13

Starting from the compound (4.141)

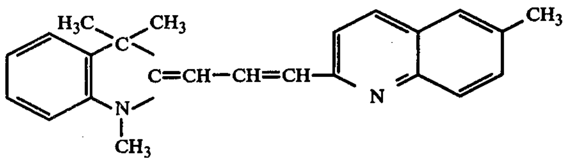

the reactive dye of formula (4.14)

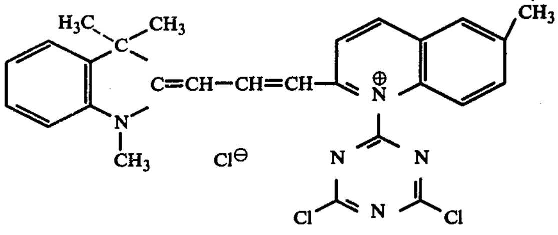

can be prepared in a single step by reacting it with cyanuric chloride in the following manner:

A solution of 2-[3-(6-methylen-2-quinolyl)-prop-2-enylidene]-1,3,3-trimethylindoline (0.50 g) in acetone (150 ml) was treated with a solution of cyanuric chloride (2.0) in acetone (200 ml). The resulting solution was stirred and heated under reflux for a period of 5 hours, and the pink solution was concentrated under reduced pressure to a low volume (10 ml). The solution was treated with ether (100 ml), left overnight at room-temperature and the dye was filtered off, washed with acetone/ether (1:10, (200 ml) and dried.

Yield: 0.40 g

M.p. 234° C. (decomp)

$\lambda_{max}$ (acetone) 520 nm

EXAMPLE 14

Starting from the aminopropyl dye used for the preparation of compound (4.10), the reactive dyestuff of formula (4.15)

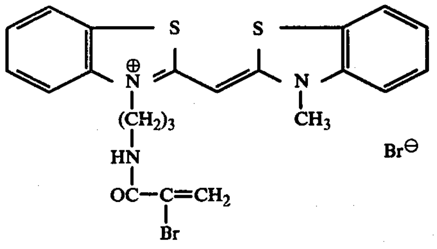

can be prepared in the following manner:

10 g of the aminopropyl dye were dissolved in 1000 ml of water and 300 ml of acetone. At 5° C. the $P_H$ was adjusted to 4.20 ml of 2,3-dibromopropionyl chloride in 20 ml of acetone were added slowly keeping the $P_H$ between 4 and 5. After 2 hours the $P_H$ was raised to 7. The solid formed was filtered off, washed well with water and dried under vacuum.

Yield: 7.8 g $\lambda_{max}$ (methanol) 425 nm

EXAMPLE 15

Starting from the aminopropyl dye used for the preparation of compound (4.8), the reactive dyestuff of formula

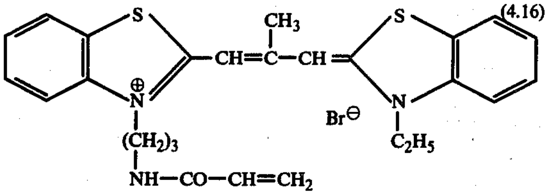

(4.16)

can be prepared in the following manner:

The aminopropyl dye (2.2 g) was dissolved in warm hydrochloric acid (4 ml) and water (10 ml) and the clear solution was poured into a stirred solution of triethylamine (7 ml) in acetone/water (1:2, 150 ml). The resulting solution was cooled to room-temperature and treated with more triethylamine (5 ml). This was followed by the addition of 3-chloropropionyl chloride (2 ml). After stirring the solution for 1.5 hours more triethylamine (3 ml) and 3-chloropropionyl chloride (1 ml) was added. The clear solution was stirred for an additional period of 1 hour and the organic solvent was evaporated under reduced pressure. The aqueous solution afforded a solid which was filtered, washed with water and dried.

Yield 0.60 g.

$\lambda_{max}$ (MeOH) 546 nm.

EXAMPLE 16

Starting from a dyestuff containing two aminopropyl groups the compound (4.17), containing two active acrylamido groups can be prepared in the following manner:

(4.171)

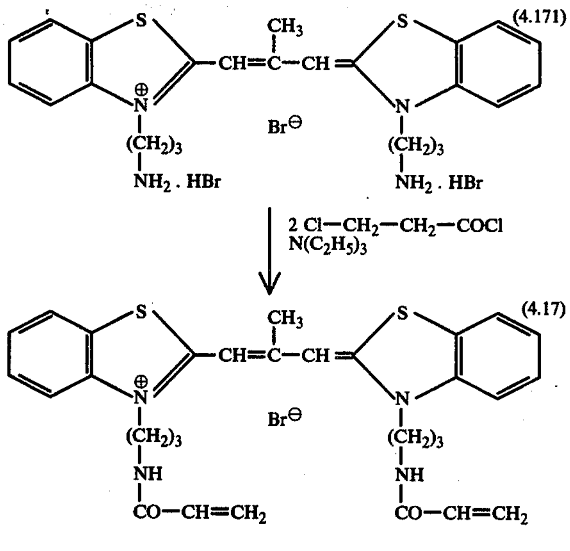

(4.17)

A solution of bis[3-(3-aminopropyl)-2-benzothiazole] $\beta$-methyltrimethincyanine bromide hydrobromide (2.4 g) in hydrobromic acid (48%, 5 ml) and water (6 ml) was poured into a stirred mixture of acetone/water (1:2, 300 ml) containing triethylamine (18 ml). The clear solution was treated with 3-chloropropionyl chloride (5.5 ml) and the solution was stirred at room-temperature for 0.25 hour. More triethylamine (5 ml) in acetone (70 ml) was added to the stirred solution which was treated with 3-chloropropionyl chloride (2.5 ml). The resulting solution was stirred for 0.5 hour and treated with triethylamine (5 ml) in acetone (50 ml) and 3-chloropropionyl chloride.

Finally the solution was stirred for 1.5 hours at room-temperature and the acetone was evaporated under reduced pressure. The aqueous solution deposited the dye which was filtered off, washed with water and dried.

Yield : 0.8 g $\lambda_{max}$ (methanol) 547 nm.

What we claim is:

1. A spectral sensitising dinuclear cyanine dye which has attached either to a heterocyclic nucleus of the dye or to the methine chain of the dye a terminal group of the formula $-NH-CO-CH=CH_2$, $-CH_2O-CO-NH-CO-CH=CH_2$, $-CH_2-NH-CO-NH-CO-CH=CH_2$, $-NH-CO-CH_2-CH_2-SO_2-CH=CH_2$ $-NH-CH_2-CH_2-SO_2-CH=CH_2$ $-NH-CO-CCl=CH_2$ $-NH\ CO-CBr=CH_2$ which is reactive with a hydrophilic colloid which contains an SH—, $NH_2$—, NH=, OH—, $-CONL_1L_2$ group, where $L_1$ and $L_2$ are each hydrogen, lower alkyl or —COOH.

2. A spectral sensitising dinuclear cyanine dye which has attached either to a heterocyclic nucleus of the dye or to the methine chain of the dye a group which is reactive with a hydrophilic colloid which contains an $-SH_1-$ $-NH_2$, =NH, —OH, $CONL_1L_2$ group, where $L_1$ and $L_2$ are each hydrogen, lower alkyl or COOH which reactive group is a diazine of the formula

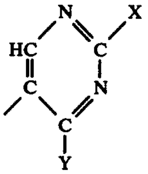

or a triazine of the formula

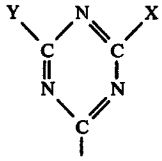

wherein at least one of X or Y is chlorine, bromine, ammonium or N-methylmorpholinium and the other if not a leaving group is hydroxy or lower alkoxy.

3. A spectral sensitising dinuclear cyanine dye which has attached either to a heterocyclic nucleus of the dye or to the methine chain of the dye a group which is reactive with a hydrophilic colloid which contains an $-SH_1-NH_2$, =NH, —OH, $CONL_1L_2$ group, where $L_1$ and $L_2$ are each hydrogen, lower alkyl or COOH which reactive group is 2-chloro-benzothiazolyl or 2,3-dichloro-quinoxaline.

4. A spectral sensitising dinuclear cyanine dye according to claim 2 of the formula

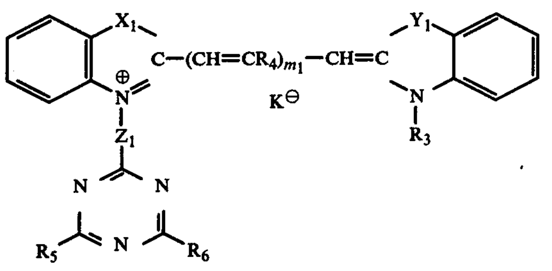

where at least one of $R_5$ and $R_6$ is chlorine, bromine, ammonium or N-methylmorpholinium and the other, if not such a group, is hydroxy or lower alkoxy, $X_1$ and $Y_1$ are each —O—, —S—, —Se— or —$NR_7$—, $R_3$ is lower alkyl, alkoxyalkyl, alkyl carboxylic acid or alkylsulphonic acid $R_4$ is hydrogen, methyl, ethyl or phenyl $R_7$ is lower alkyl $Z_1$ is $-(CH_2)_p-NH-$ wherein p is an integer of 2 to 5

$m_1$ is 0 or 1 and $K^\ominus$ is an anion.

5. A spectral sensitising dinuclear cyanine dye according to claim 2 of the formula

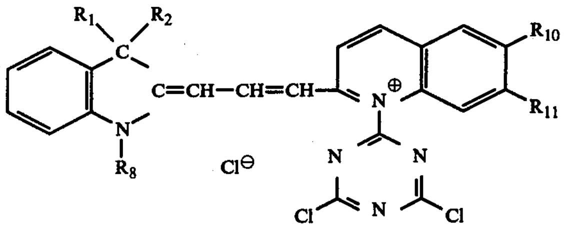

wherein $R_1$ and $R_2$ are each hydrogen or lower alkyl $R_8$ is lower alkyl, alkoxyalkyl, alkyl carboxylic acid or alkylsulphonic acid and $R_{10}$ and $R_{11}$ are each hydrogen, lower alkyl or alkoxy.

* * * * *

UNITED STATES PATENT AND TRADEMARK OFFICE

CERTIFICATE OF CORRECTION

PATENT NO. : 4,138,551

DATED : February 6, 1979

INVENTOR(S) : Rolf Steiger, et al.

It is certified that error appears in the above-identified patent and that said Letters Patent are hereby corrected as shown below:

Column 2, line 21, "Publicator" should be --Publication--.

Column 4, line 34, "cri-" should be --tri- --.

Column 13, 3.15, "" should be 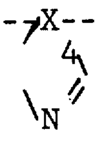.

Column 15, line 49 delete " . " after "CH=".

Column 30, line 21, "mucleus" should be --nucleus--.

Column 33, line 67, "rhodamine" should be --rhodanine--.

Column 62, formula right side "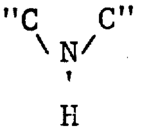" should be --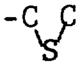--.

UNITED STATES PATENT AND TRADEMARK OFFICE
CERTIFICATE OF CORRECTION

PATENT NO. : 4,138,551
DATED : February 6, 1979
INVENTOR(S) : Rolf Steiger, et al.

It is certified that error appears in the above-identified patent and that said Letters Patent are hereby corrected as shown below:

Column 43, line 67 "400" should be --460--.

Column 47, line 37, "theaque-" should be --the aque- --.

Column 47, line 44 "an" should be --and--.

Column 48, line 31, "other" should be --ether--.

Column 54, line 59 insert --such-- after "not" and delete "leaving" after "a".

Signed and Sealed this

*Thirty-first* Day of *July 1979*

[SEAL]

*Attest:*

LUTRELLE F. PARKER

*Attesting Officer* *Acting Commissioner of Patents and Trademarks*